(12) United States Patent
Syllaios et al.

(10) Patent No.: US 7,718,965 B1
(45) Date of Patent: May 18, 2010

(54) MICROBOLOMETER INFRARED DETECTOR ELEMENTS AND METHODS FOR FORMING SAME

(75) Inventors: Athanasios J. Syllaios, Richardson, TX (US); Thomas R. Schimert, Ovilla, TX (US); Michael F. Taylor, Coppell, TX (US)

(73) Assignee: L-3 Communications Corporation, New York, NY (US)

( * ) Notice: Subject to any disclaimer, the term of this patent is extended or adjusted under 35 U.S.C. 154(b) by 346 days.

(21) Appl. No.: 11/498,939

(22) Filed: Aug. 3, 2006

(51) Int. Cl.
*G01J 5/02* (2006.01)
(52) U.S. Cl. .................................. 250/338.1
(58) Field of Classification Search ............. 250/338.1, 250/338.4
See application file for complete search history.

(56) References Cited

U.S. PATENT DOCUMENTS

| | | |
|---|---|---|
| 4,169,273 A | 9/1979 | Hendrickson |
| 4,291,815 A | 9/1981 | Gordon et al. |
| 4,352,449 A | 10/1982 | Hall et al. |
| 4,654,622 A | 3/1987 | Foss et al. |
| 4,701,424 A | 10/1987 | Mikkor |
| 4,752,694 A | 6/1988 | Hegel, Jr. et al. |
| 5,010,251 A | 4/1991 | Grinberg et al. |
| 5,021,663 A | 6/1991 | Hornbeck |
| 5,082,162 A | 1/1992 | Kamiyama et al. |
| 5,196,377 A | 3/1993 | Wagner et al. |
| 5,196,703 A | 3/1993 | Keenan |
| 5,220,188 A | 6/1993 | Higashi et al. |
| 5,260,225 A | 11/1993 | Liu et al. |
| 5,286,671 A | 2/1994 | Kurtz et al. |
| 5,286,976 A | 2/1994 | Cole |
| 5,288,649 A | 2/1994 | Keenan |
| 5,300,915 A | 4/1994 | Higashi et al. |
| 5,367,167 A | 11/1994 | Keenan |
| 5,367,194 A | 11/1994 | Beatty |
| 5,431,328 A | 7/1995 | Chang et al. |
| 5,449,910 A | 9/1995 | Wood et al. |
| 5,450,053 A | 9/1995 | Wood |

(Continued)

FOREIGN PATENT DOCUMENTS

EP 0828346 A2 3/1998

(Continued)

OTHER PUBLICATIONS

Garcia et al.,IR bolometers based on amorphous silicon germanium alloys, Jun. 15, 2004, Journal of Non-Crystalline Solids,vols. 338-340, pp. 744-748.*

(Continued)

*Primary Examiner*—David P Porta
*Assistant Examiner*—Djura Malevic
(74) *Attorney, Agent, or Firm*—O'Keefe, Egan, Peterman & Enders LLP

(57) ABSTRACT

Microbolometer infrared detector elements that may be formed and implemented by varying type/s of precursors used to form amorphous silicon-based microbolometer membrane material/s and/or by varying composition of the final amorphous silicon-based microbolometer membrane material/s (e.g., by adjusting alloy composition) to vary the material properties such as activation energy and carrier mobility. The amorphous silicon-based microbolometer membrane material/s materials may include varying amounts of one or more additional and optional materials, including hydrogen, fluorine, germanium, n-type dopants and p-type dopants.

55 Claims, 12 Drawing Sheets

U.S. PATENT DOCUMENTS

| | | | |
|---|---|---|---|
| 5,455,421 | A | 10/1995 | Spears |
| 5,512,748 | A | 4/1996 | Hanson |
| 5,534,111 | A | 7/1996 | Hocker et al. |
| 5,539,206 | A | 7/1996 | Schimert |
| 5,573,859 | A | 11/1996 | Suppelsa |
| 5,589,688 | A | 12/1996 | Kimura et al. |
| 5,605,489 | A | 2/1997 | Gale et al. |
| 5,659,195 | A | 8/1997 | Kaiser et al. |
| 5,701,008 | A | 12/1997 | Ray et al. |
| 5,726,480 | A | 3/1998 | Pister |
| 5,760,398 | A | 6/1998 | Blackwell et al. |
| 5,773,987 | A | 6/1998 | Montoya |
| 5,777,328 | A | 7/1998 | Gooch |
| 5,789,753 | A | 8/1998 | Gooch et al. |
| 5,825,029 | A | 10/1998 | Agnese et al. |
| 5,895,233 | A | 4/1999 | Higashi et al. |
| 5,905,007 | A | 5/1999 | Ho et al. |
| 5,912,464 | A | 6/1999 | Vilain et al. |
| 5,915,168 | A | 6/1999 | Salatino et al. |
| 5,919,548 | A | 7/1999 | Barron et al. |
| 5,921,461 | A | 7/1999 | Kennedy et al. |
| 5,923,995 | A | 7/1999 | Kao et al. |
| 5,929,441 | A | 7/1999 | Beratan et al. |
| 5,945,673 | A | 8/1999 | Beratan et al. |
| 5,970,315 | A | 10/1999 | Carley et al. |
| 6,028,312 | A | 2/2000 | Wadsworth et al. |
| 6,036,872 | A | 3/2000 | Wood et al. |
| 6,046,067 | A | 4/2000 | Werner |
| 6,054,745 | A | 4/2000 | Nakos et al. |
| 6,062,461 | A | 5/2000 | Sparks et al. |
| 6,064,216 | A | 5/2000 | Farnworth et al. |
| 6,087,199 | A | 7/2000 | Pogge et al. |
| 6,100,525 | A | 8/2000 | Eden |
| 6,111,254 | A | 8/2000 | Eden |
| 6,114,696 | A | 9/2000 | Eden |
| 6,114,697 | A | 9/2000 | Eden et al. |
| 6,119,920 | A | 9/2000 | Guthrie et al. |
| 6,133,570 | A | 10/2000 | Schimert et al. |
| 6,143,997 | A | 11/2000 | Feng et al. |
| 6,159,812 | A | 12/2000 | Cheek et al. |
| 6,210,988 | B1 | 4/2001 | Howe et al. |
| 6,232,150 | B1 | 5/2001 | Lin et al. |
| 6,316,770 | B1 | 11/2001 | Ouvrier-Buffet et al. |
| 6,320,189 | B1 | 11/2001 | Ouvrier-Buffet et al. |
| 6,392,232 | B1 | 5/2002 | Gooch et al. |
| 6,479,320 | B1 | 11/2002 | Gooch |
| 6,521,477 | B1 | 2/2003 | Gooch et al. |
| 6,586,831 | B2 | 7/2003 | Gooch et al. |
| 6,690,014 | B1 | 2/2004 | Gooch et al. |
| 6,777,681 | B1 | 8/2004 | Schimert et al. |
| 6,897,469 | B2 | 5/2005 | Syllaios et al. |
| 7,138,630 | B2 * | 11/2006 | Vilain ..................... 250/338.1 |
| 7,268,350 | B1 * | 9/2007 | Ouvrier-Buffet et al. . 250/338.1 |
| 2003/0102079 | A1 * | 6/2003 | Kalvesten et al. ........... 156/299 |
| 2004/0219704 | A1 * | 11/2004 | Syllaios et al. ................ 438/48 |
| 2006/0124831 | A1 | 6/2006 | Schimert et al. |
| 2006/0166467 | A1 * | 7/2006 | Witvrouw et al. ........... 438/478 |

FOREIGN PATENT DOCUMENTS

| | | |
|---|---|---|
| EP | 0951069 A1 | 10/1999 |
| EP | 0971219 A1 | 1/2000 |
| EP | 0977275 A1 | 2/2000 |
| EP | 1072875 A1 | 1/2001 |
| FR | 2780200 | 12/1999 |
| WO | WO99/50905 | 10/1999 |
| WO | WO99/67818 | 12/1999 |

OTHER PUBLICATIONS

Unewisse et al., The growth and properties of semiconductor bolometers for infrared detector, Sep. 1995, SPIE vol. 2554, pp. 43-54.*

Kamimura et al., Effect of hydrogen dilution of silane in hydrogenated amorphous silicon films prepared by photochemical vapor deposition, Dec. 1986, Japanese Journal of Applied Physics; vol. 25, No. 12, pp. 1778-1782.*

Kroll et al.;From amorphous to microcrystalline silicon films prepared by hydrogen dilution using the VHF (70 MHz) GD technique, May 1998, Journal of Non-Crystalline Solids; vols. 227-230, Part 1, pp. 68-72.*

Kroll et al.,Hydrogen in amorphous and microcrystalline silicon films prepared by hydrogen dilution, J. Appl. Phys. 80, 4971 (1996).*

Daimaru et al.,Structure of amoprphous and microcrystalline silicon thin films prepared at various gas pressures and gas flow rates by hot-wire chemical vapor deposition, available online 2005, (2006) thin solid films 501, pp. 102-106.*

S.L. Dexheimer et al.,Novel Characterization Methods for Microcrystalline Silicon Final Report May 1999-Dec. 2002, Oct. 2003, NREL/SR-520-34949. All Pages.*

Cicala et al., "Plasma Deposition of Amorphous Silicon Alloys From Fluorinated Gases", Pur & Appl. Chem., vol. 68, No. 5, pp. 1143-1149, 1996.

Sedky et al., "Characterization of Bolmeters Based on Polycrystalline Silicon Germanium Alloys", IEEE Electron Device Letters, vol. 19, No. 10, Oct. 1998, 3 pgs.

Schropp et al.. "Amorphous And Microcrystalline Silicon Solar Cells: Modeling, Materials and Device Technology", Kluwer Academic Publishers, 1998, pp. 20-22 and 49-50: 7 pgs.

Tissot et al., "Leti/Lir's Amorphous Silicon Uncooled Microbolometer Development", SPIE Conference on Infrared Detectors And Focal Plane Arrays V, vol. 3379, Apr. 1998, 6 pgs.

* cited by examiner

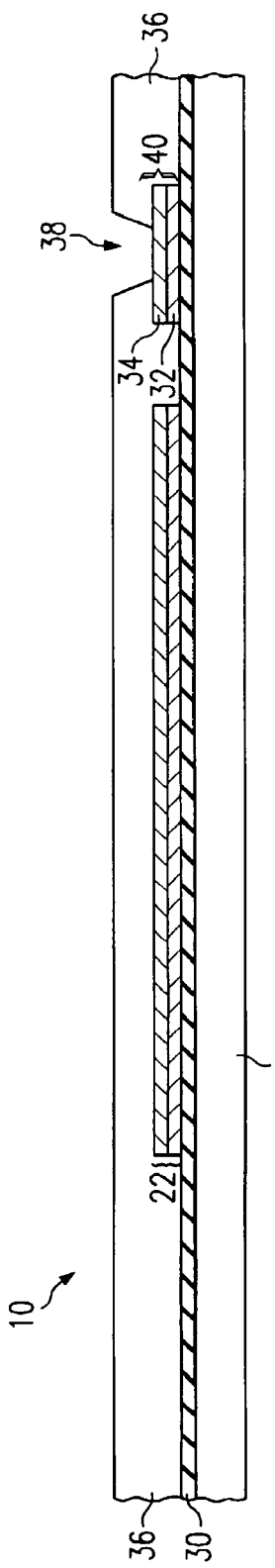
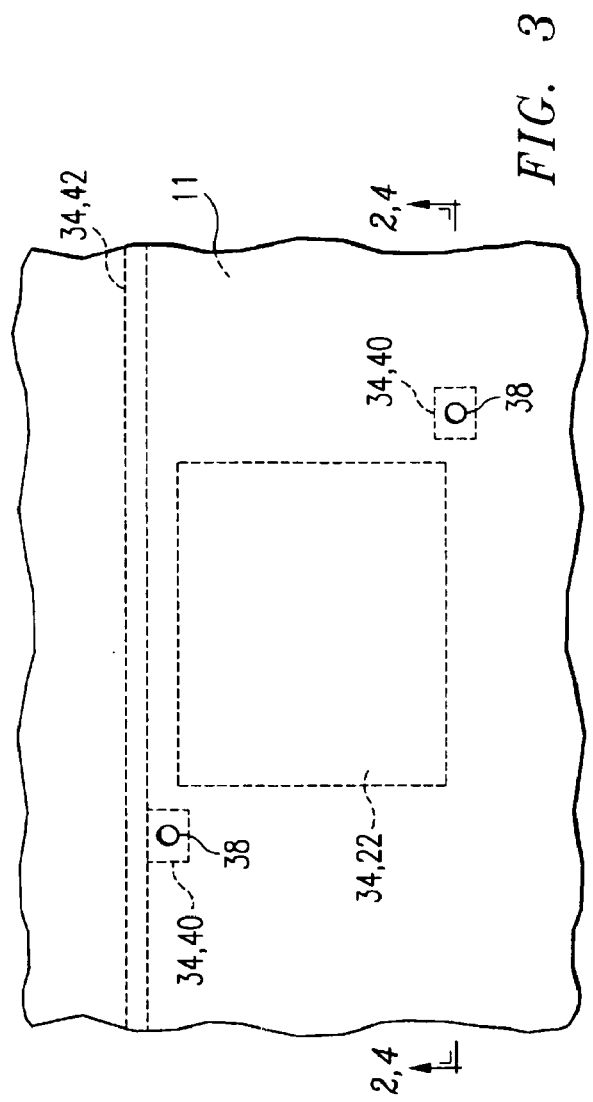

MICROBOLOMETER INFRARED DETECTOR ELEMENTS AND METHODS FOR FORMING SAME

FIELD OF THE INVENTION

This invention relates in general to infrared detectors and more particularly to microbolometer infrared detector elements and methods for forming the same.

BACKGROUND OF THE INVENTION

Infrared (IR) detectors are often utilized to detect fires, overheating machinery, planes, vehicles, people, and any other objects that emit thermal radiation. Infrared detectors are unaffected by ambient light conditions or particulate matter in the air such as smoke or fog. Thus, infrared detectors have potential use in night vision and when poor vision conditions exist, such as when normal vision is obscured by smoke or fog. IR detectors are also used in non-imaging applications such as radiometers, gas detectors, and other IR sensors.

Infrared detectors generally operate by detecting the differences in thermal radiance of various objects in a scene. That difference is converted into an electrical signal which is then processed. Microbolometers are infrared radiation detector elements that are fabricated on a substrate material using traditional integrated circuit fabrication techniques. Microbolometer detector arrays consist of thin, low thermal mass, thermally isolated, temperature-dependent resistive membrane structures. They are suspended over silicon read-out integrated circuit (ROIC) wafers by long thermal isolation legs in a resonant absorbing quarter-wave cavity design.

Conventional infrared detector arrays and imagers operating at ambient temperature include microbolometer arrays made of thin films of hydrogenated amorphous silicon (a-Si:H) or amorphous vandium oxide (VOx). Other materials used for microbolometer arrays include films of various metal (e.g., titanium) and high temperature superconductors. For an array based on amorphous silicon, the detector pixel membrane is generally comprised of an ultra-thin (~2000 Å) a-SiN$_x$/a-Si:H/a-SiN$_x$ structure. The membrane is deposited at a low temperature nominally below 400° C. using silane (SiH$_4$) and ammonia (NH$_3$) precursors for the amorphous silicon nitride (a-SiN$_x$) layers, and using silane for the hydrogenated amorphous silicon (a-Si:H) layer. Hydrogen atoms from silane (SiH$_4$) molecules are the source of hydrogen content in the a-Si:H layer. A thin absorbing metal layer such as Titanium (Ti), Titanium-Aluminum alloy (TiAl), Nichrome (NiCr), black gold, or other material absorbing in the infrared band of interest, (e.g., at wavelength range of 1 micron to 14 micron), is inserted in the membrane to enhance infrared absorptance. Contact between the a-Si:H detector electrodes and the interconnect pads on a complementary metal oxide semiconductor (CMOS) signal processor of the ROIC is accomplished by thick aluminum tab metal interconnects.

After fabrication, microbolometers are generally placed in vacuum packages to provide an optimal environment for the sensing device. Conventional microbolometers measure the change in resistance of a detector element after the microbolometer is exposed to thermal radiation. Microbolometers have applications in gas detectors, night vision, and many other situations.

The primary factors affecting response time and sensitivity of microbolometers are thermal mass and thermal isolation. Microbolometer response time is the time necessary for a detector element to absorb sufficient infrared radiation to alter an electrical property, such as resistance, of the detector element and to dissipate the heat resulting from the absorption of the infrared radiation. Microbolometer sensitivity is determined by the amount of infrared radiation required to cause a sufficient change in an electrical property of the microbolometer detector element. Microbolometer response time is inversely proportional to both thermal mass and thermal isolation. Thus, as thermal mass increases, response time becomes slower since more infrared energy is needed to sufficiently heat the additional thermal mass in order to obtain a measurable change in an electrical property of the microbolometer detector element. As thermal isolation increases, response time becomes slower since a longer period of time is necessary to dissipate the heat resulting from the absorption of the infrared radiation. Microbolometer operating frequency is inversely proportional to response time. However, microbolometer sensitivity is proportional to thermal isolation. Therefore, if a specific application requires high sensitivity and does not require high operating frequency, the microbolometer would have maximum thermal isolation and minimal thermal mass. If an application requires a higher operating frequency, a faster microbolometer may be obtained by reducing the thermal isolation which will also result in a reduction in sensitivity.

SUMMARY OF THE INVENTION

Disclosed herein are microbolometer infrared detector elements and methods for forming the same. The disclosed microbolometer infrared detector elements may be formed and implemented by varying type/s of precursors used to form amorphous silicon-based microbolometer membrane material/s and/or by varying composition of the final amorphous silicon-based microbolometer membrane material/s (e.g., by adjusting alloy composition) to vary the material properties such as activation energy and carrier mobility. Advantageously, by so varying precursor types and/or material properties of the microbolometer membrane material/s, it is possible to control and optimize device parameters including, but not limited to, resistance, thermal coefficient of resistance (TCR), electrical noise, and combinations of such device parameters.

By adjusting precursors and alloy composition of the membrane structure, the disclosed microbolometer material systems may be implemented to provide microbolometer devices having improved stability and performance compared to conventional microbolometer devices by independent control of resistance and TCR. In one exemplary embodiment, low doped material may be employed to increase TCR which results in higher microbolometer device responsivity. For example, in one exemplary embodiment low doping levels may be selected in order to obtain TCR values of from about 2% per ° C. to about 5% per ° C., and resitivity values of from about 1 ohm-centimeter to about 10,000 ohm-centimeters, although greater and lesser doping levels are also possible. Low doped material results in high resistance which is difficult to match with the input impedance of ROICs operating at ambient temperature.

The disclosed microbolometer infrared detector elements may include membrane structures formed from thin films of amorphous silicon-based materials that include varying amounts of one or more additional and optional materials, including hydrogen, fluorine, germanium, n-type dopants and p-type dopants. In this regard, the disclosed microbolometer infrared detector elements may include membrane structures formed from amorphous silicon-based materials such as fluorinated amorphous silicon-based materials that include at least fluorine and silicon constituents, amorphous silicon germanium-based materials that include at least silicon and germanium constituents, amorphous germanium-based materials that include at least germanium, and/or hydrogenated amorphous silicon-based materials that include at least amorphous silicon and that have a hydrogen content of greater than about 4 atomic percent, or a combination thereof. It will be understood that such amorphous silicon-based materials may optionally included additional constituents, for example, other elements, p-type or n-type dopants, etc. Advantageously, material properties of microbolometer membrane structures may be varied to optimize device parameters by varying the amount of hydrogen, germanium, fluorine, n-type dopants, p-type dopants, etc. within a given membrane material.

Specific examples of such amorphous silicon-based materials include, but are not limited to, undoped or doped (p-type or n-type) hydrogenated amorphous silicon (a-Si:H); undoped or doped (p-type or n-type) fluorinated amorphous silicon-based materials such as fluorinated amorphous silicon (a-Si:F), hydrogenated fluorinated amorphous silicon (a-Si:H:F) and hydrogenated fluorinated amorphous silicon germanium (a-$Si_{1-x}Ge_x$:H:F); and undoped or doped (p-type or n-type) amorphous silicon germanium-based materials such as amorphous silicon germanium (a-$Si_{1-x}Ge_x$), hydrogenated amorphous silicon germanium (a-$Si_{1-x}Ge_x$:H), and hydrogenated fluorinated amorphous silicon germanium (a-$Si_{1-x}Ge_x$:H:F), where "x" is the Ge content relative to silicon content of a-$Si_{1-x}Ge_x$ or an alloy of a-$Si_{1-x}Ge_x$:H. It is noted that in the case where the value of "x" is equal to zero, a-$Si_{1-x}Ge_x$ represents amorphous silicon (a-Si), and where "x" is equal to one, a-$Si_{1-x}Ge_x$ represents amorphous germanium (a-Ge). Further, amorphous silicon germanium-based materials having the formula a-$Si_{1-x}Ge_x$ (with or without additional constituents) are represented by the case where the value of "x" is greater than zero but less than one.

In one embodiment, the disclosed microbolometer infrared detector elements may be formed using a hydrogen-dilution process in which hydrogen ($H_2$) precursor is used to dilute other precursor materials, including those described elsewhere herein, to form amorphous silicon-based microbolometer membrane structures having improved stability and performance characteristics. Although not wishing to be bound by theory, it is believed that this improved stability and performance results from the effects that $H_2$ has on reaction and/or reaction kinetics of the amorphous silicon-based material formation process. Hydrogen dilution may be employed in the formation of thin films of amorphous silicon-based materials that include varying amounts of one or more additional materials, such as fluorine, germanium, n-type dopants, p-type dopants, etc. As an example, a microbolometer membrane structure including a-Si:H may be formed by the addition of hydrogen gas to a chemical vapor deposition (CVD) reactor, such as PECVD reactor, to dilute silane gas during membrane fabrication. Advantageously, hydrogen dilution of silane results in the growth of hydrogenated amorphous silicon (a-Si:H) which exhibits improved properties such as lower electrical noise, higher temperature coefficient of resistance (TCR) and more stable atomic configuration. In one exemplary embodiment, hydrogenated amorphous silicon having a thickness of about 600 Angstrom may be formed in a PECVD reactor using a dilution ratio of about 10:1 (i.e., about 10 parts hydrogen gas to about one part silane gas) to fabricate a microbolometer membrane structure that exhibits a reduction in noise by a factor of greater than about three (alternatively by a factor of greater than about four), in comparison to a amorphous silicon microbolometer membrane structure similarly formed but with no hydrogen dilution.

In one exemplary embodiment, hydrogen dilution may be employed to result in an amorphous silicon-based material that includes a hydrogen content that is enhanced as compared to amorphous silicon-based materials formed from $SiH_4$ precursor without hydrogen dilution. For example, hydrogen content of an amorphous silicon-based material formed with hydrogen dilution may be greater than about 4 atomic percent (%), alternatively greater than or equal to about 5 atomic %, alternatively greater than or equal to about 9 atomic %, alternatively greater than or equal to about 10 atomic %, alternatively from about 9 atomic % to about 11 atomic %.

In another embodiment, a source of germanium may be added during amorphous silicon-based material film growth to form an amorphous silicon germanium-based alloy. Examples of suitable precursors for this embodiment include, but are not limited to, precursors such as silane or silicon tetrafluoride ($SiF_4$) for the silicon source, and precursors such as germanium tetrafluoride ($GeF_4$) or Germane ($GeH_4$) as the Ge source. In this embodiment, the amount of Ge may be varied to form a a-$Si_{1-x}Ge_x$-based film having an amount of Ge, represented by "x", that may vary from 0 for pure silicon to 1 for pure germanium. The amount of Ge may be so varied to result in silicon germanium alloy-based films with an extended range of electrical properties such as resistivity, TCR and noise. As previously described, hydrogen may be added to dilute the precursor gases (in this case silicon and germanium precursor gases). For example, hydrogenated silicon germanium (a-$Si_{1-x}Ge_x$:H) may be grown from hydrogen, silane and germane precursors. In another example, hydrogenated and fluorinated amorphous silicon germanium films (a-$Si_{1-x}Ge_x$:H:F) may be grown by also adding a source of fluorine (e.g., $BF_3$ dopant and/or fluorine-based precursor such as $SiF_4$ and or $GeF_4$) to the hydrogen, silicon and germanium precursor gases.

In another embodiment, a p-type dopant may be added during the growth of amorphous silicon-based material film to introduce boron in a growing amorphous silicon-based film of a microbolometer membrane structure. Examples of suitable p-type dopants include, but are not limited to, aluminum, gallium, indium and boron, e.g., from boron sources such as boron trifluoride ($BF_3$), diborane ($B_2H_6$), Trimethyl Boron ($B(CH_3)_3$ (TMB), Boron Trichloride ($BCl_3$), etc. In one exemplary embodiment, $BF_3$ may be utilized as a source of both boron p-type dopant and fluorine atoms for forming a fluorinated amorphous silicon-based material. Advantageously fluorine atoms promote stable atomic configuration of the amorphous silicon film by preferentially etching and removing weakly bonded silicon atoms. During film growth, some of the fluorine atoms are incorporated in the film and the resulting doped film is also fluorinated.

In yet another embodiment, a n-type dopant may be added during amorphous silicon-based material film growth to dope a film with n-type dopant. Examples of suitable n-type dopants include, but are not limited to, sources of phosphorous such as phosphine ($PH_3$) that may be added during film growth. For example, silicon germanium films may be doped with n-type dopant by adding such a n-type dopant during growth of the film.

As previously described, a fluorinated amorphous silicon-based material may be formed by adding at least one fluorine source may be during the growth of amorphous silicon-based material film to introduce fluorine in a growing amorphous silicon-based film of a microbolometer membrane structure. Examples of suitable precursors for this embodiment include, but are not limited to, precursors such silicon tetrafluoride (SiF$_4$), germanium tetrafluoride (GeF$_4$) and boron trifluoride (BF$_3$).

In another embodiment, amorphous silicon-based material films may be grown near the amorphous-crystalline phase transition to result in a stable amorphous atomic structure, e.g., an amorphous silicon-based material structure that contains an amount of microcrystallites that is less than or equal to about 10% by volume of the amorphous silicon-based material (as determined by Raman spectroscopy) and that are from about 1 nanometers to about 10 nanometers in size (as determined by x-ray diffraction). However, it will be understood that amorphous silicon-based material films may contain an amount of microcrystallites greater than about 10% by volume of the amorphous silicon-based material, and/or that have a size of less than about 1 nanometer or greater than about 10 nanometers.

Examples of amorphous silicon-based materials disclosed herein include, but are not limited to, undoped or doped (p-type or n-type) hydrogenated amorphous silicon (a-Si:H), fluorinated amorphous silicon (a-Si:F), hydrogenated fluorinated amorphous silicon (a-Si:H:F), amorphous silicon germanium (a-Si$_{1-x}$Ge$_x$), hydrogenated amorphous silicon germanium (a-Si$_{1-x}$Ge$_x$:H), and hydrogenated fluorinated amorphous silicon germanium (a-Si$_{1-x}$Ge$_x$:H:F). Amorphous silicon-based material films may be grown in one exemplary embodiment by chemical vapor deposition (CVD), such as plasma enhanced chemical vapor deposition (PECVD), using silane and optionally one or more other precursors. For example, silane, hydrogen and germanium tetrafluoride (GeF$_4$) precursors may be used to form an a-Si$_{1-x}$Ge$_x$:H alloy with specific composition "x" by adjusting the ratio of H$_2$, SiH$_4$ and GeF$_4$ flow rates. In such a case, growth parameters such as temperature, growth rate and addition of H$_2$ may be selected so that a silicon germanium alloy structure is amorphous, but near the amorphous-to-crystalline phase transition. In other embodiments, amorphous silicon-based materials may be formed by any other technique that is suitable for forming the same such as sputtering, molecular beam epitaxy, etc. For example, amorphous silicon germanium (a-Si$_{1-x}$Ge$_x$) may be formed by sputtering of silicon and germanium or by molecular beam epitaxy using silicon and germanium.

In addition to PECVD, any other method/s for growing films of amorphous silicon-based materials may be employed, for example, to grow and form a-Silicon Nitride/a-Silicon-based material/a-Silicon Nitride microbolometer pixel membranes or any other configuration of microbolometer pixel membrane that includes amorphous silicon-based material. Examples of such alternative growth techniques include, but are not limited to, Hot Wire Chemical Vapor Deposition (HWCVD), Electron Cyclotron Resonance Chemical Vapor Deposition (ECR-CVD), and Microwave CVD.

Using the methods and materials disclosed herein, a microbolometer infrared detector element pixel may be provided that in one embodiment includes a suspended membrane of amorphous silicon-based material that is disposed between two layers of amorphous-silicon nitride that support and adjust the overall stress of the membrane, although any other suitable microbolometer membrane configuration may be employed. As disclosed herein, such microbolometer infrared detector elements may be provided in one embodiment in the form of microbolometer bridge structures that may be used to form large arrays. Further, the microbolometer pixel optical design of a microbolometer infrared detector element pixel may be of any suitable configuration, for example, a refractive resonant cavity or a diffractive resonant cavity (DRC).

In one respect, disclosed herein is an infrared detector element including: a substrate; and an infrared detector membrane disposed in spaced relationship above the substrate. The infrared detector membrane may include an amorphous silicon-based material, the amorphous silicon-based material including at least one of a fluorinated amorphous silicon-based material, an amorphous silicon germanium-based material, an amorphous germanium-based material, a hydrogenated amorphous silicon-based material having a hydrogen content of greater than about 4 atomic percent, or a combination thereof.

In another respect, disclosed herein is a focal plane array assembly, including: a substrate; and a plurality of infrared detector elements, each of the plurality of infrared detector elements including an infrared detector membrane disposed in spaced relationship above the substrate, and read out integrated circuitry (ROIC) electrically coupled to the infrared detector membrane. The infrared detector membrane of each of the plurality of infrared detector elements may include an amorphous silicon-based material, the amorphous silicon-based material including at least one of a fluorinated amorphous silicon-based material, an amorphous silicon germanium-based material, an amorphous germanium-based material, a hydrogenated amorphous silicon-based material having a hydrogen content of greater than about 4 atomic percent, or a combination thereof.

In another respect, disclosed herein is a method for making an infrared detector element, the method including: providing a substrate; and forming an infrared detector membrane in spaced relationship above a surface of the substrate. The infrared detector membrane may include an amorphous silicon-based material, the amorphous silicon-based material including at least one of a fluorinated amorphous silicon-based material, an amorphous silicon germanium-based material, an amorphous germanium-based material, a hydrogenated amorphous silicon-based material having a hydrogen content of greater than about 4 atomic percent, or a combination thereof.

In another respect, disclosed herein is a method of making a focal plane array assembly, the method including: providing a substrate; and forming a plurality of infrared detector elements, each of the plurality of infrared detector elements including an infrared detector membrane disposed in spaced relationship above the substrate, and read out integrated circuitry (ROIC) electrically coupled to the infrared detector membrane. The infrared detector membrane may include an amorphous silicon-based material, the amorphous silicon-based material including at least one of a fluorinated amorphous silicon-based material, an amorphous silicon germanium-based material, an amorphous germanium-based material, a hydrogenated amorphous silicon-based material having a hydrogen content of greater than about 4 atomic percent, or a combination thereof.

In another respect, disclosed herein is a method for making an infrared detector element, the method including: providing a substrate; forming an infrared detector membrane in spaced relationship above a surface of the substrate, the infrared detector membrane including amorphous silicon-based material; and forming the amorphous silicon-based material from precursors including at least one source of silicon and boron trifluoride ($BF_3$).

BRIEF DESCRIPTION OF THE DRAWINGS

FIG. 2 is a cross-section illustration of a partially formed microbolometer of one embodiment disclosed herein.

FIG. 3 is a diagram illustrating the partially fabricated microbolometer after completing the steps illustrated in FIG. 2.

FIG. 14B is a schematic illustration of an array of spiral leg pixels connected electrically in parallel for large non-imaging arrays for maximized fill factor; and.

DESCRIPTION OF ILLUSTRATIVE EMBODIMENTS

Figure 1A:
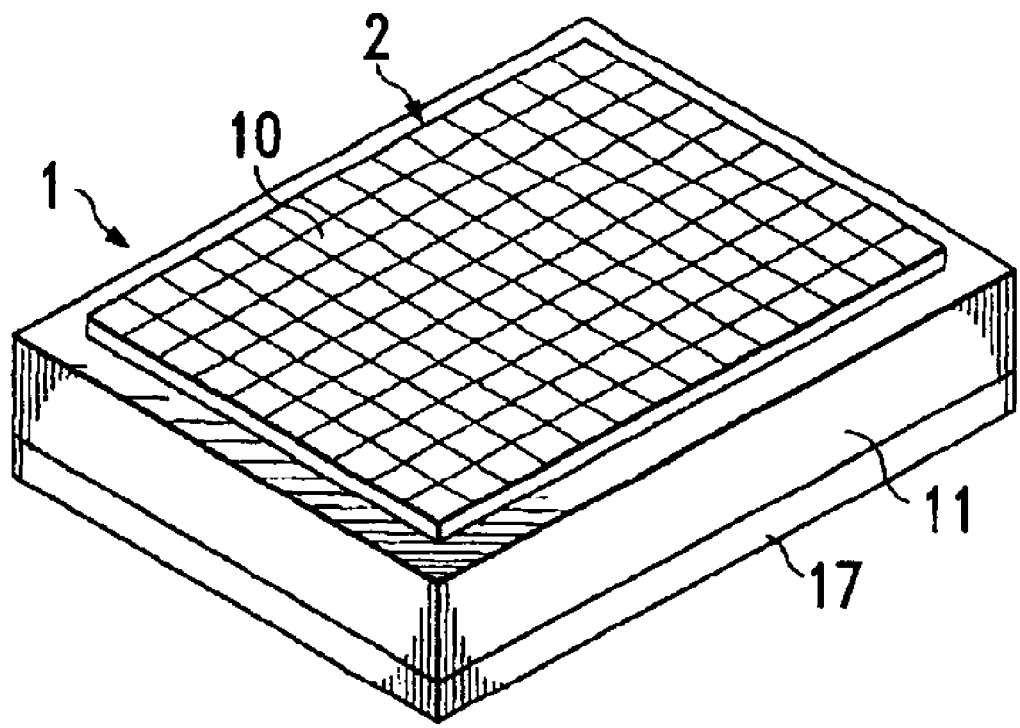
FIG. 1A is a perspective view of an infrared detector according to one embodiment disclosed herein.

FIG. 1A is a diagrammatic perspective view of one embodiment of an infrared detector 1 which is capable of sensing thermal energy and of outputting electrical signals representative of a two-dimensional image of that sensed thermal energy. The infrared detector 1 includes a focal plane array 2 disposed on a substrate 11. The substrate 11 may include an integrated circuit of a type which is commonly known as a read out integrated circuit (ROIC). The ROIC reads out the thermal information gathered by the focal plane array 12.

A thermal element 17 may be optionally provided on the side of the substrate 16 opposite from the focal plane array 2, in order to serve as a form of controlled heat sink which maintains the integrated circuit substrate 11 at a substantially constant temperature which is predefined. The constant temperature prevents ambient or internally generated temperature gradients from affecting operation of the focal plane 2, and thus provides a baseline with which the thermal energy impinging on the focal plane array 2 may be accurately measured.

Figure 1B:
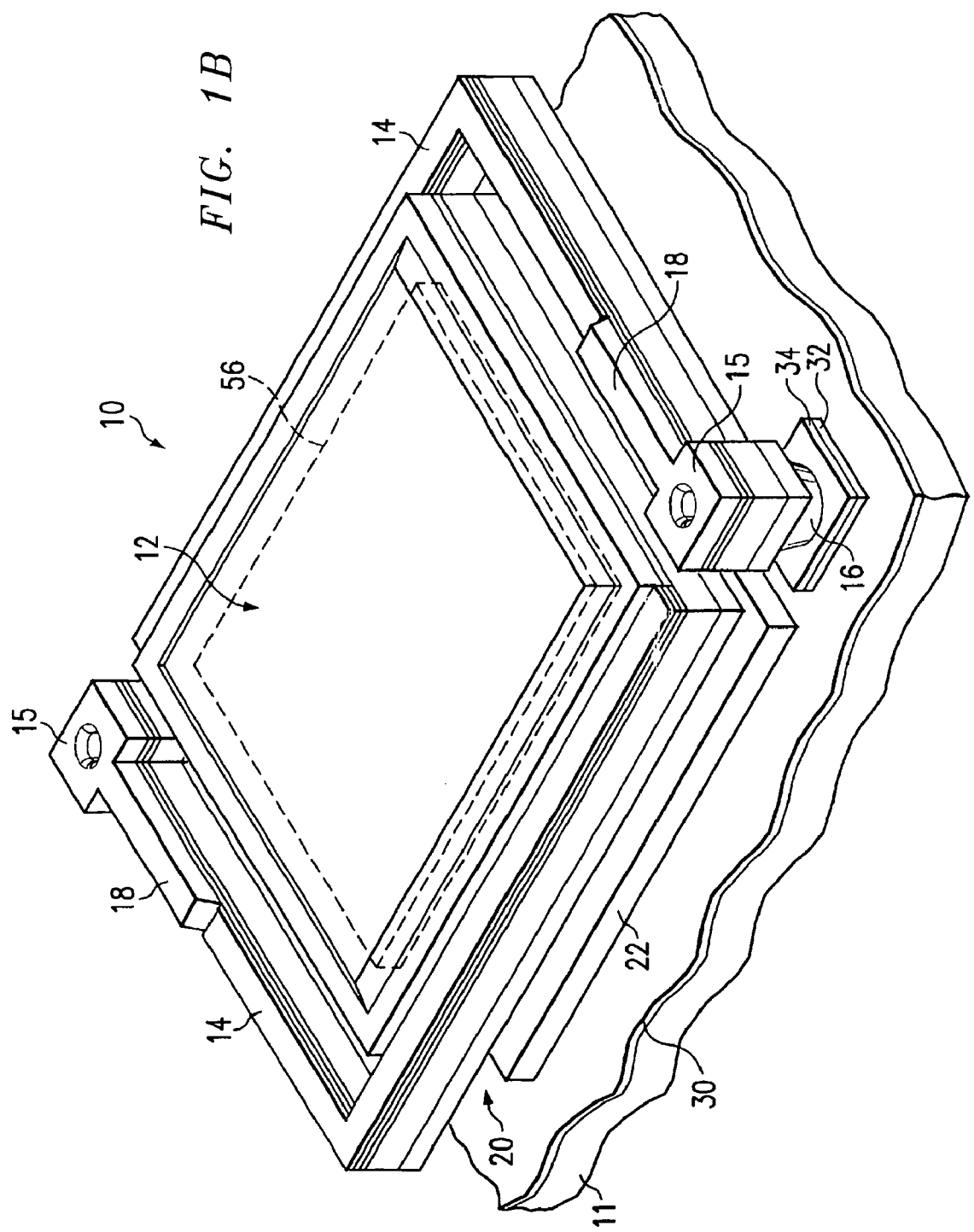
FIG. 1B is a perspective of a microbolometer infrared detector element formed on a substrate in accordance with one embodiment disclosed herein.

The focal plane 2 includes a plurality of thermal sensors or detector elements, one of which is designated by reference numeral 10. The detector elements are arranged in a two-dimensional array, and each detector element 10 corresponds to a respective pixel in each image detected by the infrared detector 1. The focal plane array 2 of the disclosed embodiment includes 76,800 detector elements 10, which are arranged in a 320 by 240 array. For clarity, however, FIG. 1A diagrammatically depicts only about 140 detector elements. It will be recognized that the total number of detector elements 10 in the focal plane array 2 could be larger or smaller. Further, even though FIG. 1A shows the detector elements 10 arranged in a two-dimensional array, they could alternatively be arranged in a one-dimensional array, or could be provided at arbitrary locations that do not conform to a specific pattern. With reference to FIG. 1B, one of the detector elements 10 of FIG. 1A will be described in more detail.

More specifically, FIG. 1B is a diagrammatic fragmentary perspective view of a portion of the integrated circuit substrate 11, which has one of the detector elements 10 on it that is formed in the configuration of a microbolometer infrared detector element in accordance with one exemplary embodiment disclosed herein. In the disclosed embodiment, the detector elements all have the same structural configuration, and therefore only one of them is illustrated and described here in detail. In this embodiment, microbolometer infrared detector element 10 is formed on a substrate 11. Substrate 11 may be any suitable substrate material including a monocrystalline silicon wafer or a silicon wafer containing a readout integrated circuit (ROIC). In this embodiment, microbolometer infrared detector element 10 is a sensor that is operable to detect infrared radiation.

Still referring to FIG. 1B, microbolometer infrared detector element 10 includes thermal isolation legs 14 coupled to a detector membrane 12. Infrared radiation sensed by the detector membrane 12 results in a measurable change in the resistance of the material comprising the detector. Detector membrane 12 is suspended over the surface of substrate 11 by thermal isolation legs 14. Construction of the detector membrane 12 may be in several layers of various materials as discussed in further detail below. In this exemplary embodiment, two thermal isolation legs 14 are coupled along one side of detector membrane 12 and proceed unattached along a second, adjacent side to an electrode terminal end 15. A post 16 is coupled to the electrode terminal end 15 of thermal isolation leg 14. Post 16 provides structural support and electrical connection for microbolometer 10. Electrical circuitry connected to electrode terminal ends 15 provides a constant voltage across the thermal isolation legs 14 and senses a change in electrical current flowing through detector membrane 12. The magnitude of the change in electrical current varies with the amount of infrared radiation detected. In an alternate embodiment, the electrical circuitry may provide a constant electrical current flowing through detector membrane 12 and senses a change in the voltage across thermal isolation legs 14.

The thermal mass of microbolometer 10 affects the thermal isolation, response time, operating frequency, and sensitivity. By fabricating a microbolometer with minimal thermal mass, high sensitivity and high operating frequency may be realized. Thermal isolation of microbolometer 10 from substrate 11 also affects the operating frequency and sensitivity. Thermal isolation of detector membrane 12 from substrate 11 increases the sensitivity of microbolometer 10 since less infrared radiation energy is necessary to raise the temperature of detector membrane 12. Thermal isolation also affects the operating frequency and response time of microbolometer 10 since it affects the cooling rate of detector membrane 12. An increase in thermal isolation results in a corresponding decrease in cooling rate of detector membrane 12 and, thus, a corresponding decrease in operating frequency of microbolometer 10.

In one embodiment, a single step in the fabrication of microbolometer 10 may be modified to place a thermal shunt 18 on thermal isolation legs 14 coupled to posts 16 to decrease the thermal isolation of microbolometer 10. Placing a thermal shunt 18 on thermal isolation leg 14 will increase the operating frequency of microbolometer 10 since the cooling rate of detector membrane 12 is increased. Thermal shunt 18 on thermal isolation legs 14 also results in decreased sensitivity since more thermal coupling between detector membrane 12 and substrate 11 exists. Thus, an increased amount of infrared radiation energy is necessary to increase the temperature of detector membrane 12 resulting in a corresponding change in the electrical resistance of the detector. By varying the length of thermal shunt 18, and thus the amount of thermal shunt material deposited on thermal isolation legs 14, a microbolometer 10 with differing operating frequency and sensitivity characteristics may be fabricated.

As shown for the exemplary embodiment of FIG. 1B, beneath detector membrane 12 is an antireflective structure and resonant cavity 20. Antireflective structure 20 functions to minimize the amount of infrared radiation unabsorbed by detector membrane 12 and may be present in one embodiment to enhance absorption of infrared radiation. Detector membrane 12 is suspended above the surface of substrate 11 at a height of approximately one-quarter wavelength of the infrared radiation to be detected by microbolometer 10. The one-quarter wavelength height causes infrared energy waves unabsorbed by detector membrane 12 to be reflected by reflector 22 and trapped in antireflective structure 20 until the infrared radiation is absorbed by detector membrane 12. Antireflective structure 20 creates a more efficient microbolometer 10 since the amount of infrared radiation absorbed by detector membrane 12 is maximized.

Referring now to FIG. 2, semiconductor substrate or integrated circuit 11 provides the base for the formation of microbolometer 10. A silicon dioxide layer 30 is formed on substrate 11. A thin layer of titanium 32 is next formed on silicon dioxide layer 30 followed by a thin layer of aluminum 34. Aluminum layer 34 and titanium layer 32 are patterned using a photoresist and etch process to form connection pads 40 for providing electrical connections to other electrical circuitry for microbolometer 10. In addition, aluminum layer 34 and titanium layer 32 are patterned to form reflector 22 for providing a reflective surface within antireflective structure and the resonant cavity 20 as shown in FIG. 1B. In one exemplary embodiment, microbolometer 10 is formed as a part of a readout integrated circuit (ROIC). One connection pad 40 of microbolometer 10 passes through the surface dielectric layer of the substrate 11 to make contact with the underlying electrical circuitry. The other connection pad 40 of microbolometer 10 is coupled to a common bus formed from the aluminum layer 34 on the surface of substrate 11. FIG. 3 illustrates in part aluminum layer 34 after patterning by the photoresist and etch technique.

As shown in FIG. 2, a polyimide layer 36 is deposited in this exemplary embodiment over the entire structure to a depth on the order of one-quarter wavelength of the infrared radiation to be detected. A one-quarter wavelength depth provides the proper spacing between reflector 22 of antireflective structure 20 and the bottom surface of detector membrane 12. The polyimide 36 is an organic material. Openings are etched in polyimide layer 36 to expose aluminum connection pads 40 to define post receptors 38. Post receptors 38 are holes in electrode terminal ends 15 that will eventually contain an aluminum post providing structural support and electrical connections for microbolometer 10. Post receptors 38 may be formed using a photoresist and etch technique. FIG. 3 illustrates in part the location of post receptors 38.

Figure 4:
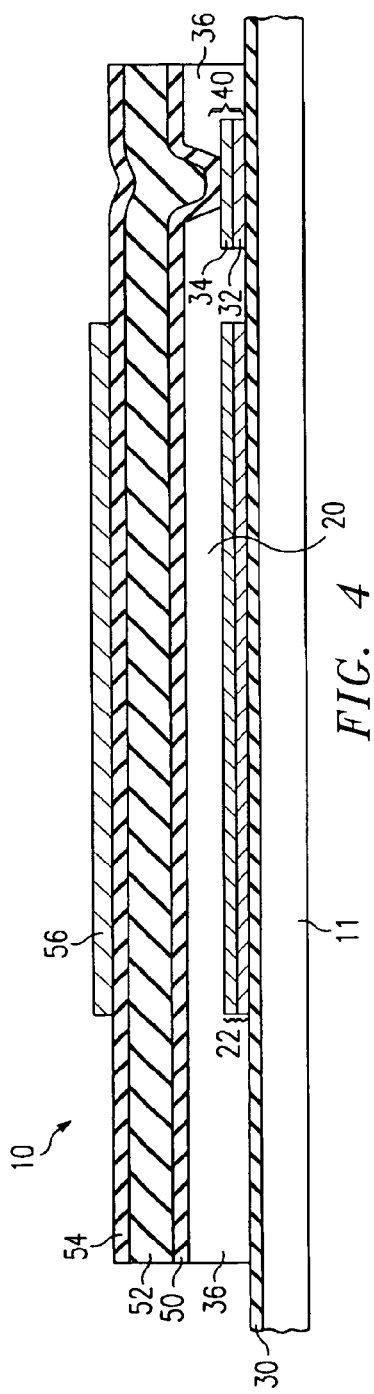
FIG. 4 is a cross-section illustration of a method of forming the microbolometer of one embodiment disclosed herein.

Referring now to FIG. 4, a first low stress dielectric film 50 is formed on the surface of the existing structure, e.g., to a depth of from about 50 Angstroms (Å) to about 1000 Angstroms (Å), alternatively to a depth of about 300 Angstroms (Å), although depths of less than about 50 Angstroms (Å) and greater than about 1000 Angstroms (Å) are also possible. In one embodiment, first low stress dielectric film 50 may be an amorphous silicon nitride material but may be any other suitable dielectric material, e.g., silicon oxide. First low stress dielectric film 50 may be formed using, for example, PECVD or other suitable method. Next, detector element layer 52 is formed to obtain a resistive layer to function as the detector element in microbolometer 10. In one embodiment, the deposition may take place at a temperature just below that which will degrade polyimide layer 36 (e.g., from about 360° C. to about 450° C., alternatively at about 365° C.). Further information on deposition of detector element layer 52 is given below in relation to Tables 1-6. A second low stress dielectric film 54 is then deposited on detector element layer 52 to a depth of from about 50 Angstroms (Å) to about 1000 Angstroms (Å), alternatively to a depth of about 250 Angstroms (Å), although depths of less than about 50 Angstroms (Å) and greater than about 1000 Angstroms (Å) are also possible.

A detector element layer 52 of detector membrane 12 is next formed on the surface of the structure in contact with first low stress dielectric film 50, e.g., to a depth of from about 500 to about 1,000 Angstroms (Å), although depths of less than about 500 Angstroms (Å) and greater than about 1000 Angstroms (Å) are also possible. Detector element layer 52 is resistive and may be an amorphous silicon-based material that includes varying amounts of one or more additional materials, including hydrogen, fluorine and/or germanium. In one exemplary embodiment, detector element layer 52 may include an amorphous silicon-based material such as undoped or doped (p-type or n-type) hydrogenated amorphous silicon (a-Si:H), hydrogenated fluorinated amorphous silicon (a-Si:H:F), amorphous silicon germanium (a-Si$_{1-x}$Ge$_x$), hydrogenated amorphous silicon germanium (a-Si$_{1-x}$Ge$_x$:H), or hydrogenated fluorinated amorphous silicon germanium (a-Si$_{1-x}$Ge$_x$:H:F).

An amorphous silicon-based material may be grown as detector element layer 52 using PECVD or other suitable method, e.g., Hot Wire Chemical Vapor Deposition (HWCVD), Electron Cyclotron Resonance Chemical Vapor Deposition (ECR-CVD), Microwave CVD, etc. Tables 1-6 below list exemplary parameters for growth in a PECVD reactor of selected amorphous silicon-based materials. In each of the tables below, the second column provides exemplary parameter ranges in within which one or more parameters may be varied to achieve desired material properties, e.g., flow rate of silane may be varied relative to flow rate of germane to achieve the desired value of "x" in an a-Si$_{1-x}$Ge$_x$-based material.

In each of the embodiments described below, an amorphous silicon-based material may be optionally grown as an amorphous silicon-based material structure that contains an amount of microcrystallites that is less than or equal to about 10% by volume of the amorphous silicon-based material (as determined by Raman spectroscopy) and that are from about 1 nanometers to about 10 nanometers in size (as determined by x-ray diffraction). In this regard, the substrate temperature, plasma power (when using PECVD reactor) and hydrogen dilution ratio may be optionally set to drive the silicon or silicon germanium structure near the amorphous to crystalline transition where the material has stable (low energy) configuration. However, it will be understood that growth parameters may be varied to achieve desired amorphous silicon-based materials, including amorphous silicon-based materials containing microcrystallites in an amount greater than about 10% by volume of the amorphous silicon-based material, and/or that have a size of less than about 1 nanometer or greater than about 10 nanometers. For example, higher substrate temperature, higher plasma power, and greater amounts of hydrogen dilution tend to increase the microcrystallite amount.

It will be understood that the particular combinations of precursor materials given in Tables 1-6 are exemplary only, and that any other combination of sources of silicon, hydrogen, germanium, fluorine, p-type dopant and/or n-type dopant (and relative amounts thereof) that is suitable for forming undoped or doped (p-type or n-type) amorphous silicon-based materials such as hydrogenated amorphous silicon (a-Si:H), fluorinated amorphous silicon (a-Si:F), hydrogenated fluorinated amorphous silicon (a-Si:H:F), amorphous silicon germanium (a-Si$_{1-x}$Ge$_x$), hydrogenated amorphous silicon germanium (a-Si$_{1-x}$Ge$_x$:H), fluorinated amorphous silicon germanium (a-Si$_{1-x}$Ge$_x$:F), and hydrogenated fluorinated amorphous silicon germanium (a-Si$_{1-x}$Ge$_x$:H:F) materials may be employed. For example, p-doped fluorinated amorphous silicon (a-Si:F) material film may be grown in one exemplary embodiment in a PECVD reactor from SiF$_4$ and BF$_3$ precursors, and undoped fluorinated amorphous silicon (a-Si:F) material film may be grown in one exemplary embodiment from SiF$_4$ precursor. Similarly, p-doped fluorinated amorphous silicon germanium (a-Si$_{1-x}$Ge$_x$:F) material film may be grown in one exemplary embodiment in a PECVD reactor from SiF$_4$, GeF$_4$ and BF$_3$ precursors, and undoped fluorinated amorphous silicon germanium (a-Si$_{1-x}$Ge$_x$:F) material film may be grown in one exemplary embodiment from SiF$_4$ and GeF$_4$ precursors. It will also be understood that the particular parameter values and parameter value ranges (e.g., precursor amounts and ranges of precursor amounts) in each of Tables 1-6 are also exemplary, e.g., flow rates and ranges of flow rates given for each of SiH$_4$, SiF$_4$, H$_2$, BF$_3$, GeH$_4$, GeF$_4$, BCl$_3$, and/or PH$_3$ may be greater than or less than the values given in each respective Table 1-6.

In addition, it will also be understood that the parameter ranges and parameter values given in each table are exemplary only, and that any other combination of parameter ranges or parameter values suitable for formation of the amorphous silicon-based materials described herein may be employed. In this regard, the values of the growth parameters, such as the precursor gas flow rates, may be determined and set appropriately for the various desired final material composition, e.g., such as Ge composition "x" value. Further, it will be understood that PECVD reactor parameters (e.g., LF power density duty cycle may vary), and that the amount of precursors (e.g., SiH$_4$ and/or H$_2$) that may be provided in argon or other suitable diluent may be varied (e.g., greater than about 5% or less than about 5%) as needed or desired to form the indicated material of each table.

In one exemplary embodiment detector element layer 52 may be grown as undoped a-Si:H with or without hydrogen dilution. Table 1 below lists exemplary parameters for growth in a PECVD reactor of an undoped a-Si:H material, with third column giving exemplary parameters for growth of undoped a-Si:H material film grown with hydrogen dilution to have a hydrogen content of 10 atomic %, although hydrogen contents of greater or less than about 10 atomic % are also possible.

TABLE 1

Parameters for PECVD growth of undoped a-Si:H Using Hydrogen Dilution

| Parameter | Exemplary Parameter Range | Exemplary Parameter Value for Hydrogen Content = 10 Atomic % |
|---|---|---|
| Substrate Temperature | about 50° C. to about 450° C. | about 365° C. |
| Total Pressure | about 500 mTorr to about 1800 mTorr | about 1800 mTorr |
| High Frequency (HF) Power | about 5 Watts to about 25 Watts | about 9 Watts |
| HF Power density | about 0.005 Watts/cm$^2$ to about 0.03 Watts/cm$^2$ | about 0.011 Watts/cm$^2$ |
| Low Frequency (LF) Power (50% duty cycle) | about 50 Watts to about 150 Watts | about 150 Watts |
| LF Power density | about 0.03 Watts/cm$^2$ to about 0.1 Watts/cm$^2$ | about 0.088 Watts/cm$^2$ |
| 5% SiH$_4$ in Argon (Ar) Flow rate | about 60 standard cubic centimeter per minute (sccm) to about 480 sccm | about 120 sccm |
| 6% H$_2$ in Argon (Ar) Flow rate | About 120 sccm to about 1800 sccm | about 1200 sccm |
| H$_2$ dilution (ratio of hydrogen flow rate to SiH$_4$ flow rate) | about 1:1 to about 100:1 | about 10:1 |
| Typical Growth rate | about 0.5 Å/second to about 2.0 Å/second | about 0.8 Å/second |

In another exemplary embodiment detector element layer 52 may be grown as a p-doped a-Si:H:F with or without hydrogen dilution. Table 2 below lists exemplary parameters for growth in a PECVD reactor of p-doped a-Si:H:F material with the third column giving exemplary parameters for growth of p-doped a-Si:H:F material film having fluorine content of 1 atomic % and grown with hydrogen dilution to have a hydrogen content of 10 atomic %. In one exemplary embodiment, p-doped a-Si:H:F may be formed having a fluorine content of from about 1 atomic % to about 10 atomic %, it being understood that fluorine contents greater than about 10 atomic % and less than about 1 atomic % are also possible, as are hydrogen contents of greater or less than about 10 atomic %.

TABLE 2

Parameters for PECVD growth of p-doped a-Si:H:F with or without Hydrogen Dilution

| Parameter | Exemplary Parameter Range | Exemplary Parameter Value for Fluorine Content = 1 atomic % and Hydrogen Content = 10 atomic % |
|---|---|---|
| Substrate Temperature | about 50° C. to about 450° C. | about 365° C. |
| Total Pressure | about 500 mTorr to about 1800 mTorr | about 1800 mTorr |
| High Frequency (HF) Power | about 5 Watts to about 25 Watts | about 9 Watts |
| HF Power density | about 0.005 Watts/cm$^2$ to about 0.03 Watts/cm$^2$ | about 0.011 Watts/cm$^2$ |
| Low Frequency (LF) Power (50% duty cycle) | about 50 Watts to about 150 Watts | about 150 Watts |
| LF Power density | about 0.03 Watts/cm$^2$ to about 0.1 Watts/cm$^2$ | about 0.088 Watts/cm$^2$ |
| 5% SiH$_4$ in Argon (Ar) Flow rate | about 60 standard cubic centimeter per minute (sccm) to about 480 sccm | about 120 sccm |
| BF$_3$ Flow rate | about 0.4 sccm to about 10 sccm | about 1 sccm |
| 6% H$_2$ in Ar Flow rate | 0 sccm to about 1800 sccm | about 1200 sccm |
| H$_2$ dilution (ratio of hydrogen flow rate to SiH$_4$ flow rate) | about 1:1 to about 100:1 | about 10:1 |
| Typical Growth rate | about 0.5 Å/second to about 2.0 Å/second | about 0.8 Å/second |

Table 2 illustrates formation of a p-doped a-Si:H:F material using BF$_3$ as both source of boron p-dopant and a source of fluorine atoms. Advantageously, BF$_3$ has a boiling temperature that is relatively low compared to the boiling temperature of BCl$_3$, meaning that the potential for film-damaging condensation from the p-type dopant source is reduced. However, it will be understood that other p-type dopants and combinations of p-type dopants may be employed to dope an amorphous silicon-based material in the formation of membrane structures for the disclosed microbolometer infrared detector elements. Examples of other types of p-type dopants that may be employed include, but are not limited to, aluminum, gallium, indium and boron, e.g., from boron sources such as diborane (B$_2$H$_6$), Trimethyl Boron (B(CH$_3$)$_3$ (TMB), Boron Trichloride (BCl$_3$), and combinations thereof. Such p-type dopant sources do not contain fluorine atoms and therefore may be employed instead of BF$_3$ to form non-fluorinated p-doped a-Si:H, with or without hydrogen dilution. In this regard, any one or more p-type dopant sources may be substituted for BF$_3$ in Table 2 at the same gaseous flow rates as indicated for BF$_3$ in Table 2, or may be separately added in combination with BF$_3$.

It will also be understood that other fluorine sources and combinations of fluorine sources may be employed to incorporate fluorine into an amorphous silicon-based material in the formation of membrane structures for the disclosed microbolometer infrared detector elements. Examples of other sources of fluorine include, but are not limited to, a combined silicon and fluorine source such as SiF$_4$. In one embodiment, SiF$_4$ may be substituted for BF$_3$ in Table 2 at the same gaseous flow rates indicated for BF$_3$ in Table 2 to form an undoped a-Si:H:F with or without hydrogen dilution. Alternatively SiF$_4$ may be substituted for SiH$_4$ at the same gaseous flow rates indicated for SiH$_4$ in Table 2, and in combination with BF$_3$, to form a p-doped a-Si:H:F with or without hydrogen dilution. In yet another alternative, SiF$_4$ may be substituted for SiH$_4$ at the same gaseous flow rates indicated for SiH$_4$ in Table 2, and without the presence of another source of fluorine (e.g., without BF$_3$) to form undoped a-Si:H:F.

In another exemplary embodiment detector element layer 52 may be grown as an undoped a-Si$_{1-x}$Ge$_x$:H with or without hydrogen dilution. The second column of Table 3 below lists exemplary parameter ranges for growth in a PECVD reactor of undoped a-Si$_{1-x}$Ge$_x$:H material. The third column of Table 3 gives exemplary parameters for growth of undoped a-Si$_{1-x}$Ge$_x$:H material film having germanium content "x" of 0.5 relative to silicon and grown with hydrogen dilution to have a hydrogen content of 10 atomic %, although hydrogen contents of greater or less than about 10 atomic % are also possible. In one exemplary embodiment, undoped a-Si$_{1-x}$Ge$_x$:H material may be grown having a germanium content "x" that is from about 0 to about 1, with undoped a-Ge:H material being grown in one exemplary embodiment where the value of "x" is equal to 1.

TABLE 3

Parameters for PECVD growth of undoped a-Si$_{1-x}$Ge$_x$:H with or without Hydrogen Dilution

| Parameter | Exemplary Parameter Range | Exemplary Parameter Value for Hydrogen Content = 10 Atomic %, and "x" = about 0.5 |
|---|---|---|
| Substrate Temperature | about 50° C to about 450° C. | about 365° C. |
| Total Pressure | about 500 mTorr to about 1800 mTorr | about 1800 mTorr |
| High Frequency (HF) Power | about 5 Watts to about 25 Watts | about 9 Watts |
| HF Power density | about 0.005 Watts/cm$^2$ to about 0.03 Watts/cm$^2$ | about 0.011 Watts/cm$^2$ |
| Low Frequency (LF) Power (50% duty cycle) | about 50 Watts to about 150 Watts | about 150 Watts |
| LF Power density | about 0.03 Watts/cm$^2$ to about 0.1 Watts/cm$^2$ | about 0.088 Watts/cm$^2$ |
| 5% SiH$_4$ in Argon (Ar) Flow rate | about 60 standard cubic centimeter per minute (sccm) to about 480 sccm | about 120 sccm |
| GeH$_4$ undiluted Flow rate | about 0.4 sccm to about 5.0 sccm | About 1.0 sccm |
| 6% H$_2$ in Ar Flow rate | 0 sccm to about 1800 sccm | about 1200 sccm |
| H$_2$ dilution (ratio of hydrogen flow rate to SiH$_4$ + GeH$_4$ flow rate) | about 1:1 to about 100:1 | about 10:1 |
| Typical Growth rate | about 0.5 Å/second to about 2.0 Å/second | about 0.8 Å/second |

It will be understood that other germanium sources and combinations of germanium sources may be employed to incorporate germanium into an amorphous silicon-based material in the formation of membrane structures for the disclosed microbolometer infrared detector elements. Examples of other sources of germanium include, but are not limited to germanium tetrafluoride (GeF$_4$). In one embodiment, GeF$_4$ may be substituted for germane (GeH$_4$) in Table 3 at the same gaseous flow rates indicated for GeH$_4$ in Table 3 to form an undoped a-Si:Ge:H:F with or without hydrogen dilution. In another exemplary embodiment, GeF$_4$ may be substituted for GeH$_4$ in Table 3 at the same gaseous flow rates indicated for GeH$_4$, and SiF$_4$ may be substituted for SiH$_4$ in Table 3 at the same gaseous flow rates indicated for SiH$_4$ in Table 3 to form an undoped a-Si:Ge:F, or which may optionally be formed as a-Si:Ge:H:F with the addition of hydrogen dilution.

In another exemplary embodiment detector element layer 52 may be grown as a p-doped a-Si$_{1-x}$Ge$_x$:H:F with or without hydrogen dilution. The second column of Table 4 below lists exemplary parameter ranges for growth in a PECVD reactor of p-doped a-Si$_{1-x}$Ge$_x$:H:F material. The third column of Table 3 gives exemplary parameters for growth of p-doped a-Si$_{1-x}$Ge$_x$:H:F material film having germanium content "x" of 0.5, fluorine content of 1% and grown with hydrogen dilution to have a hydrogen content of 10 atomic %. In one exemplary embodiment, p-doped a-Si$_{1-x}$Ge$_x$:H:F material film may be grown having germanium content of "x" that is from about 0 to about 1, and having a fluorine content of from about 0.5 to about 2 atomic %, it being understood that fluorine contents greater than about 2 atomic % and less than about 0.5 atomic % are also possible, as are hydrogen contents of greater or less than about 10 atomic %.

TABLE 4

Parameters for PECVD growth of p-doped a-Si$_{1-x}$Ge$_x$:H:F with or without Hydrogen Dilution

| Parameter | Exemplary Parameter Range | Exemplary Parameter Value for Fluorine Content = 1 Atomic %, Hydrogen Content = 10 Atomic %, and "x" = about 0.5 |
|---|---|---|
| Substrate Temperature | about 50° C. to about 450° C. | about 365° C. |
| Total Pressure | about 500 mTorr to about 1800 mTorr | about 1800 mTorr |
| High Frequency (HF) Power | about 5 Watts to about 25 Watts | about 9 Watts |
| HF Power density | about 0.005 Watts/cm$^2$ to about 0.03 Watts/cm$^2$ | about 0.011 Watts/cm$^2$ |
| Low Frequency (LF) Power (50% duty cycle) | about 50 Watts to about 150 Watts | about 150 Watts |
| LF Power density | about 0.03 Watts/cm$^2$ to about 0.1 Watts/cm$^2$ | about 0.088 Watts/cm$^2$ |
| 5% SiH$_4$ in Argon (Ar) Flow rate | about 60 standard cubic centimeter per minute (sccm) to about 480 sccm | about 120 sccm |
| GeF$_4$ undiluted Flow rate | about 0.4 sccm to about 5.0 sccm | About 1.6 sccm |
| BF$_3$ undiluted Flow rate | about 0.4 sccm to about 10 sccm | about 3 sccm |
| 6% H$_2$ in Ar Flow rate | 0 sccm to about 1800 sccm | about 1200 sccm |
| H$_2$ dilution (ratio of hydrogen flow rate to SiH$_4$ + GeF$_4$ flow rate) | about 1:1 to about 100:1 | about 10:1 |
| Typical Growth rate | about 0.5 Å/second to about 2.0 Å/second | about 0.8 Å/second |

Table 4 illustrates formation of a p-doped a-Si$_{1-x}$Ge$_x$:H:F material using GeF$_4$ as both a source of germanium and fluorine atoms in combination with BF$_3$ which acts as both source of boron p-dopant and a source of fluorine atoms. However, as previously described in relation to Table 2, other p-type dopants and combinations of p-type dopants may be employed including, but not limited to, aluminum, gallium, indium and boron from other sources of boron such as diborane (B$_2$H$_6$), Trimethyl Boron (B(CH$_3$)$_3$ (TMB), Boron Trichloride (BCl$_3$), and combinations thereof. In this regard, any one or more p-type dopant sources may be substituted for BF$_3$ in Table 4 at the same gaseous flow rates indicated in Table 4, or may be separately added in combination with BF$_3$ to result in p-doped a-Si$_{1-x}$Ge$_x$:H:F material.

As further described previously in relation to Table 2, it will be understood that other fluorine sources and combinations of fluorine sources may be employed including, but not limited to, a combined silicon and fluorine source such as SiF$_4$. In one embodiment, SiF$_4$ may be substituted for BF$_3$ in Table 4 at the same gaseous flow rates indicated for BF$_3$ in Table 4 to form an undoped a-Si$_{1-x}$Ge$_x$:H:F with or without hydrogen dilution. Alternatively SiF$_4$ may be substituted for SiH$_4$ at the same gaseous flow rates indicated for SiH$_4$ in Table 4, and in combination with BF$_3$, BCl$_3$ or other p-type dopant source to form a p-doped a-Si$_{1-x}$Ge$_x$:H:F with or without hydrogen dilution.

In another exemplary embodiment detector element layer 52 may be grown as a p-doped a-Si$_{1-x}$Ge$_x$:H with or without hydrogen dilution. The second column of Table 5 below lists exemplary parameter ranges for growth in a PECVD reactor of p-doped a-Si$_{1-x}$Ge$_x$:H material. The third column of Table 5 gives exemplary parameters for growth of p-doped a-Si$_{1-x}$Ge$_x$:H material film having germanium content "x" of 0.5 and grown with hydrogen dilution to have a hydrogen content of 10 atomic %, although hydrogen contents of greater or less than about 10 atomic % are also possible. In one exemplary embodiment, p-doped a-Si$_{1-x}$Ge$_x$:H material film may be grown having germanium content "x" that is from about 0 to about 1.

TABLE 5

Parameters for PECVD growth of p-doped a-Si$_{1-x}$Ge$_x$:H with or without Hydrogen Dilution

| Parameter | Exemplary Parameter Range | Exemplary Parameter Value for Hydrogen Content = 10 Atomic %, and "x" = about 0.5 |
|---|---|---|
| Substrate Temperature | about 50° C. to about 450° C. | about 365° C. |
| Total Pressure | about 500 mTorr to about 1800 mTorr | about 1800 mTorr |
| High Frequency (HF) Power | about 5 Watts to about 25 Watts | about 9 Watts |
| HF Power density | about 0.005 Watts/cm$^2$ to about 0.03 Watts/cm$^2$ | about 0.011 Watts/cm$^2$ |
| Low Frequency (LF) Power (50% duty cycle) | about 50 Watts to about 150 Watts | about 150 Watts |
| LF Power density | about 0.03 Watts/cm$^2$ to about 0.1 Watts/cm$^2$ | about 0.088 Watts/cm$^2$ |
| 5% SiH$_4$ in Argon (Ar) Flow rate | about 60 standard cubic centimeter per minute (sccm) to about 480 sccm | about 120 sccm |
| GeH$_4$ undiluted Flow rate | about 0.4 sccm to about 5.0 sccm | About 1.0 sccm |
| BCl$_3$ undiluted Flow rate | about 0.4 sccm to about 10 sccm | about 1 sccm |
| 6% H$_2$ in Argon (Ar) Flow rate | About 120 sccm to about 1800 sccm | about 1200 sccm |
| H$_2$ dilution (ratio of hydrogen flow rate to SiH$_4$ + GeH$_4$ flow rate) | about 1:1 to about 100:1 | about 10:1 |
| Typical Growth rate | about 0.5 Å/second to about 2.0 Å/second | about 0.8 Å/second |

Table 5 illustrates formation of a p-doped a-Si$_{1-x}$Ge$_x$:H material using GeH$_4$ as source of germanium in combination with BCl$_3$ which acts as source of boron p-dopant. However, as previously described in relation to Table 2, other p-type dopants and combinations of p-type dopants may be employed including, but not limited to, aluminum, gallium, indium, and boron, e.g., from boron sources such as diborane ($B_2H_6$), Trimethyl Boron ($B(CH_3)_3$ (TMB), Boron Trichloride ($BCl_3$), and combinations thereof. In this regard, any one or more p-type dopant sources may be substituted for $BCl_3$ in Table 5 at the same gaseous flow rates indicated in Table 5, or may be separately added in combination with $BCl_3$ to result in p-doped a-$Si_{1-x}Ge_x$:H material.

In another exemplary embodiment detector element layer 52 may be grown as a n-doped a-$Si_{1-x}Ge_x$:H with or without hydrogen dilution. The second column of Table 6 below lists exemplary parameter ranges for growth in a PECVD reactor of n-doped a-$Si_{1-x}Ge_x$:H material. The third column of Table 6 gives exemplary parameters for growth of n-doped a-$Si_{1-x}Ge_x$:H material film having germanium content "x" of about 0.5 and grown with hydrogen dilution to have a hydrogen content of 10 atomic %, although hydrogen contents of greater or less than about 10 atomic % are also possible. In one exemplary embodiment n-doped a-$Si_{1-x}Ge_x$:H may be grown having germanium content "x" that is from about 0 to about 1.

TABLE 6

Parameters for PECVD growth of n-doped a-$Si_{1-x}Ge_x$:H with or without Hydrogen Dilution

| Parameter | Exemplary Parameter Range | Exemplary Parameter Value for Hydrogen Content = 10 Atomic %, and "x" = about 0.5 |
|---|---|---|
| Substrate Temperature | about 50° C. to about 450° C. | about 365° C. |
| Total Pressure | about 500 mTorr to about 1800 mTorr | about 1800 mTorr |
| High Frequency (HF) Power | about 5 Watts to about 25 Watts | about 9 Watts |
| HF Power density | about 0.005 Watts/cm$^2$ to about 0.03 Watts/cm$^2$ | about 0.011 Watts/cm$^2$ |
| Low Frequency (LF) Power (50% duty cycle) | about 50 Watts to about 150 Watts | about 150 Watts |
| LF Power density | about 0.03 Watts/cm$^2$ to about 0.1 Watts/cm$^2$ | about 0.088 Watts/cm$^2$ |
| 5% $SiH_4$ in Argon (Ar) Flow rate | about 60 standard cubic centimeter per minute (sccm) to about 480 sccm | about 120 sccm |
| $GeH_4$ undiluted Flow rate | about 0.4 sccm to about 5.0 sccm | About 1.0 sccm |
| $PH_3$ | About 0.1 sccm to about 10 sccm | about 1 sccm |
| 6% $H_2$ in Argon (Ar) Flow rate | About 120 sccm to about 1800 sccm | about 1200 sccm |
| $H_2$ dilution (ratio of hydrogen flow rate to $SiH_4$ + $GeH_4$ flow rate) | about 1:1 to about 100:1 | about 10:1 |
| Typical Growth rate | about 0.5 Å/second to about 2.0 Å/second | about 0.8 Å/second |

Table 6 illustrates formation of n-doped a-$Si_{1-x}Ge_x$:H material using $PH_3$ as both source of n-dopant. However, it will be understood that other n-type dopants and combinations of n-type dopants may be employed to dope an amorphous silicon-based material in the formation of membrane structures for the disclosed microbolometer infrared detector elements. Examples of other types of n-type dopants that may be employed include, but are not limited to, nitrogen, arsenic, antimony, and combinations thereof. In this regard, any one or more n-type dopants may be substituted for $PH_3$ in Table 6 at the same gaseous flow rates indicated in Table 6, or may be separately added in combination with $PH_3$. It will also be understood that one or more n-type dopants may be used to form n-doped a-Si:H (e.g., with hydrogen dilution), n-doped a-Si:H:F (e.g., with or without hydrogen dilution), as well as fluorinated n-doped amorphous silicon-based materials such as n-doped a-$Si_{1-x}Ge_x$:H and n-doped a-$Si_{1-x}Ge_x$:H:F. For example, n-type dopant/s may be employed in the formation of other types of amorphous silicon-based material membrane structures for the disclosed microbolometer infrared detector elements by substituting n-type dopant source/s for p-type dopant source/s in previous Tables 1-5, or by adding n-type dopant source/s where no p-type dopant source/s is present in previous Tables 1-5, in each case at the same n-type gaseous flow rates indicated in Table 6. It is also possible that n-type dopants and p-type dopants may be employed together in the formation of amorphous silicon-based material membrane structures with properties of the amorphous silicon-based material membrane structures being adjusted by varying relative amount of n-type to p-type dopant, e.g., to form compensated semiconductor material.

Since detector element layer 52 is transparent to infrared radiation, a material sensitive to infrared radiation is used to thermally transfer energy absorbed from the infrared radiation. A thin metal absorber film 56 is deposited on second low stress dielectric film 54 to a depth of from about 50 to about 150 Angstroms (Å), although depths less than about 50 Angstroms (Å) and greater than about 150 Angstroms (Å) are also possible. In one embodiment, thin metal absorber film 56 may be titanium but alternatively may be any other suitable material that will absorb infrared radiation. Thin metal absorber film 56 is patterned to leave an absorber area on detector membrane 12. Absorber 56 may be patterned using a photoresist and etch technique, or other available techniques such as by a photoresist liftoff method.

Figure 5:
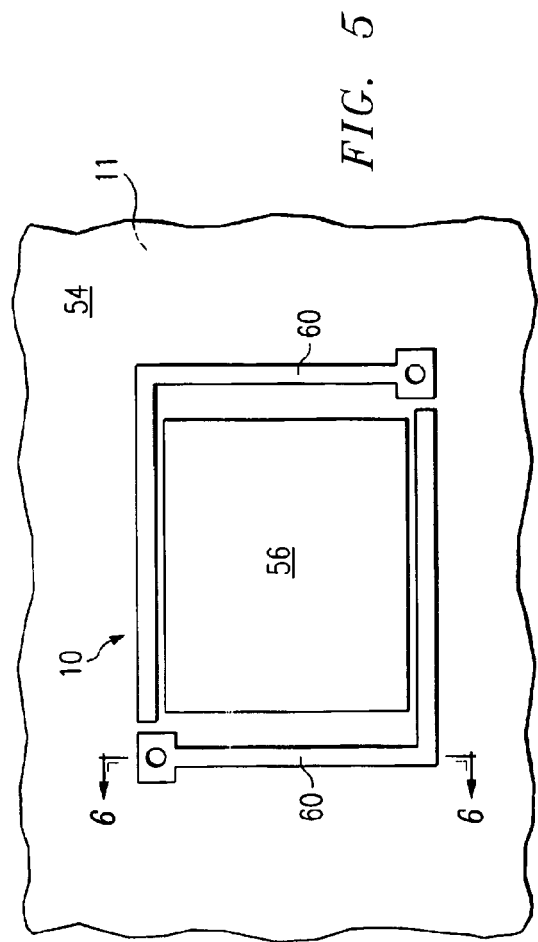
FIG. 5 is a diagram illustrating a partially fabricated microbolometer after completion of the steps illustrated in FIG. 4.

FIG. 5 illustrates in part the location of absorber 56 in relation to the structure of microbolometer 10 for this exemplary embodiment. Absorber 56 absorbs heat from infrared radiation and transfers the heat to detector element layer 52. Although second low stress dielectric film 54 provides electrical insulation for detector element layer 52, it does not thermally isolate detector element layer 52 from absorber 56. Thus, detector element layer 52 is thermally coupled to absorber 56 resulting in the transfer of thermal energy from absorber 56 to detector element layer 52. As detector element layer 52 increases in temperature, the electrical resistance of detector element layer 52 changes. The change in electrical resistance is measured and processed to yield a quantity of infrared radiation present in the detection area. Any infrared radiant energy not absorbed by absorber 56 passes through the structure, reflects off reflector 22, and becomes trapped in antireflective structure 20 such that absorber 56 absorbs the trapped infrared radiant energy. Therefore, absorber 56 absorbs infrared radiant energy both as it passes through detector membrane 12 and after it becomes trapped in antireflective structure 20.

Referring to FIG. 5, absorber 56 is shown in relation to microbolometer 10 formed on substrate 11. In the illustrated embodiment, the outer surface of second low stress dielectric film 54 is patterned and openings are etched to expose portions of the outer surface of detector element layer 52 to define thermal isolation leg channels 60. In this embodiment, the second low stress dielectric film layer 54 may be patterned and etched, for example, using a photoresist and etch technique.

Figure 6:
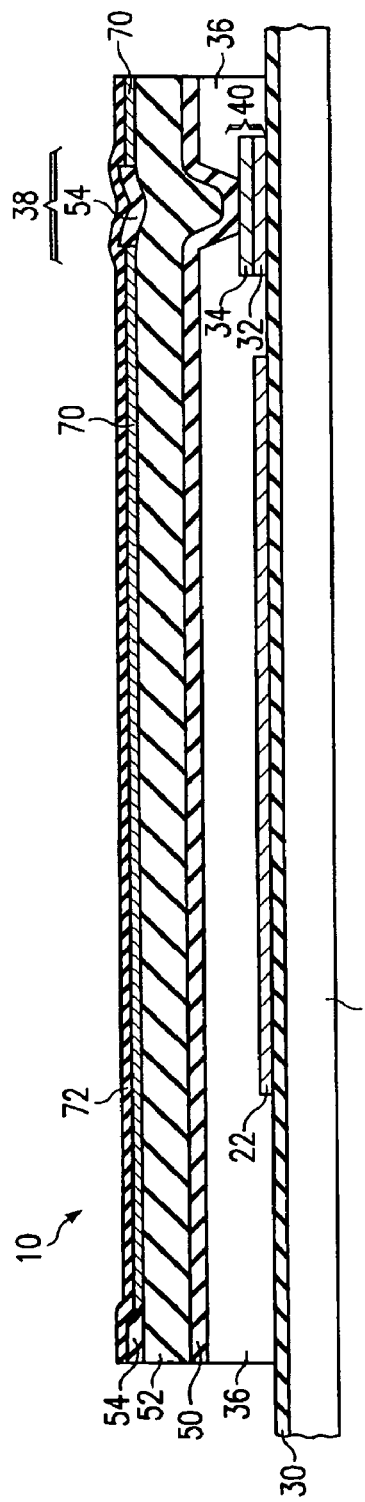
FIG. 6 is a cross-section illustration of a method of forming the microbolometer of one embodiment disclosed herein.

Referring now to FIG. 6, a thin electrode metal layer 70 is deposited in thermal isolation leg channels 60 to a depth of from about 50 Angstroms (Å) to about 250 Angstroms (Å), and alternatively to a depth of about 200 Angstroms (Å), although depths less than about 50 Angstroms (Å) and greater than about 250 Angstroms (Å) are also possible. In one embodiment, electrode metal layer 70 may be titanium or nickel and may be deposited using a photoresist and lift-off technique. Electrode metal layer 70 may be in direct contact with detector element layer 52 to provide a low resistance electrical connection between the detector element of detector membrane 12 (i.e., detector element layer 52) and electrical circuitry to measure the change in resistance of detector membrane 12 in response to absorbing infrared radiation. A third low stress dielectric film 72 is deposited on the surface of the structure to a depth of about 100 Angstroms (Å), in order to provide a final layer of protection for microbolometer 10, although depths less than or greater than about 100 Angstroms (Å) are also possible.

In an alternate embodiment of the process for fabricating microbolometer 10, the deposition of a thin metal absorber film 56 may form both absorber 56 and electrode metal layer 70. In this alternate embodiment, after second low stress dielectric film 54 is deposited, the outer surface of second low stress dielectric film 54 may be patterned and openings may be etched to expose portions of the outer surface of detector element layer 52 to define thermal isolation leg channels 60, e.g., using a photoresist and etch technique. Thin metal absorber film 56 may be deposited over the structure to a depth of from about 50 to about 150 Angstroms (Å), although depths less than about 50 Angstroms (Å) and greater than about 150 Angstroms (Å) are also possible. Thin metal absorber film 56 may be patterned using a photoresist and etch technique to leave absorber 56 and electrode metal layer 70. The process of this alternate embodiment eliminates a separate step for deposition of electrode metal layer 70.

Figure 7:
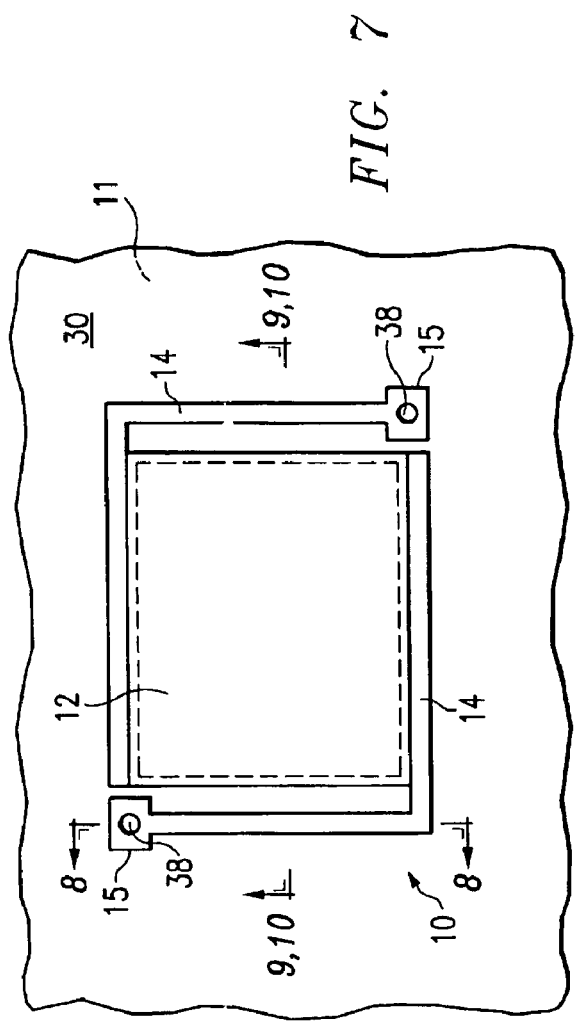
FIG. 7 is a diagram illustrating the microbolometer of one embodiment disclosed herein after etching to define a final form of the microbolometer.

Referring now to FIG. 7, a photoresist and etch technique may be used to pattern the structure to form microbolometer 10. The areas surrounding microbolometer 10 may be etched down to the polyimide layer 36 and post receptors 38 may be etched down to the aluminum layer 34. At this point, microbolometer 10 includes several layers of material stacked on top of a polyimide layer 36. In this embodiment, polyimide layer 36 will be removed in a later step to create a space between substrate 11 and both detector membrane 12 and thermal isolation legs 14. In order to support detector membrane 12 and thermal isolation legs 14 above the surface of substrate 12, posts may be formed in post receptors 38 to provide both structural support and electrical connections for microbolometer 10. Post receptors 38 may be formed in electrode terminal ends 15 by removing the previously deposited layers of first low stress dielectric film 50, detector element layer 52, second low stress dielectric film 54, and third low stress dielectric film 72 thereby exposing connection pads 40. Post receptors 38 may be formed using a photoresist and etch technique simultaneously with defining the bolometer 10. In this embodiment, the base layer of post receptor 38 is connection pad 40 and the top layers of post receptor 38 is electrode metal layer 70. Therefore, an electrically conductive material may be used to electrically couple thermal isolation legs 14 with connection pads 40.

In an alternate exemplary embodiment of the process for fabrication of microbolometer 10, post receptors 38 may not be etched in polyimide layer 36 immediately after polyimide layer 36 is formed. In addition, the photoresist and etch step to form the structure of microbolometer 10 does not etch and reform post receptors 38. Instead, a separate photoresist and etch step may be added to remove all layers above connection pads 40.

Figure 8:
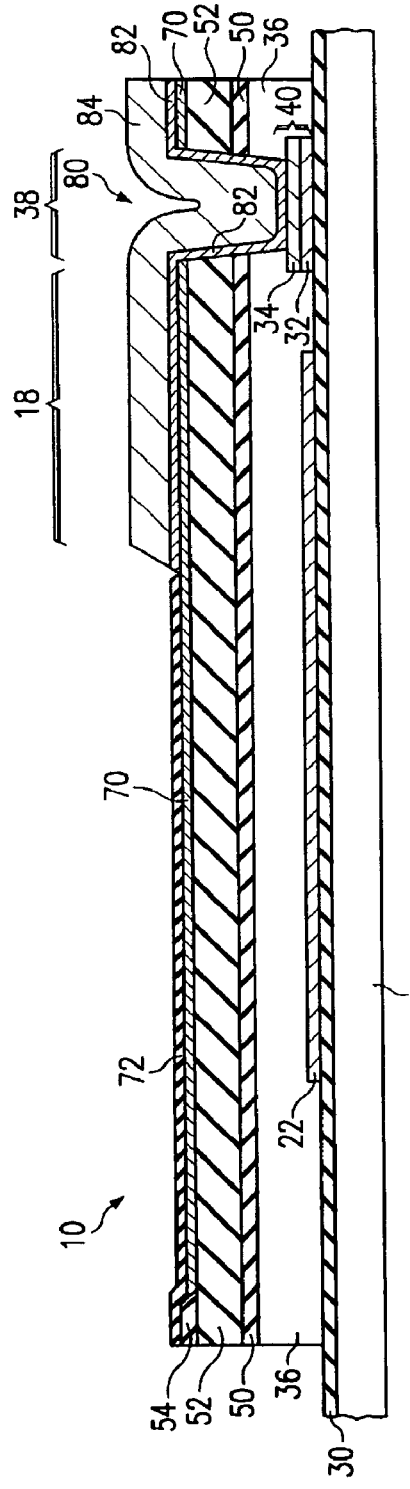
FIG. 8 is a cross-section diagram illustrating deposition of a post and thermal shunting device.

Referring now to FIG. 8, third low stress dielectric film 72 may be removed from thermal isolation legs 14 in the area to receive a post 80 and thermal shunt 18. Third low stress dielectric film 72 may be removed using a photoresist and etch technique to expose electrode metal layer 70. A thin layer of titanium 82 and a thick layer of aluminum 84 may be deposited in post receptor 38 and on electrode terminal end 15. Titanium layer 82 and the aluminum layer 84 may be deposited in sequence and patterned at the same time, e.g., by a liftoff or by an etching technique. Titanium layer 82 and aluminum layer 84 also form thermal shunt 18 on thermal isolation leg 14. Titanium layer 82 may be deposited to a depth of from about 250 Angstroms (Å) to about 550 Angstroms (Å) thick, alternatively to a depth of about 1,000 Angstroms (Å), and the aluminum layer 84 may be deposited to a depth of from about 10,000 to about 30,000 Angstroms (Å) thick, although titanium layer 82 depths less than about 250 Angstroms (Å) and greater than about 550 Angstroms (Å) are also possible, as are aluminum layer 84 depths of less than about 10,000 Angstroms (Å) and greater than about 30,000 Angstroms (Å).

Still referring to FIG. 8, post 80 and thermal shunt 18 comprise titanium layer 82 and aluminum layer 84 deposited in and around post receptor 38. Titanium layer 82 and aluminum layer 84 comprising post 80 may be deposited using a sputtered film process and patterned using a etching technique or a photoresist and lift off technique. Although post 80 is described as comprising titanium and aluminum layers, any suitable metal, metal layers, or metal alloys may be used such as nickel in combination with titanium and aluminum. Post 80 provides both structural support for microbolometer 10 by suspending detector membrane 12 above the surface of substrate 11 and electrical connection between thermal isolation leg 14 and connection pads 40. Post 80 is formed in electrode terminal ends 15. Therefore, in one exemplary embodiment, each microbolometer 10 will have two posts 80, one on each of two opposite corners.

In addition to providing structural support and electrical connections for microbolometer 10, posts 80 of the illustrated embodiment also provide thermal shunting for microbolometer 10. By increasing the length of thermal shunt 18 over electrode metal layer 70, the thermal isolation of microbolometer 10 may be reduced. This results in a microbolometer with increased operating frequency and decreased sensitivity as previously described.

Figure 9:
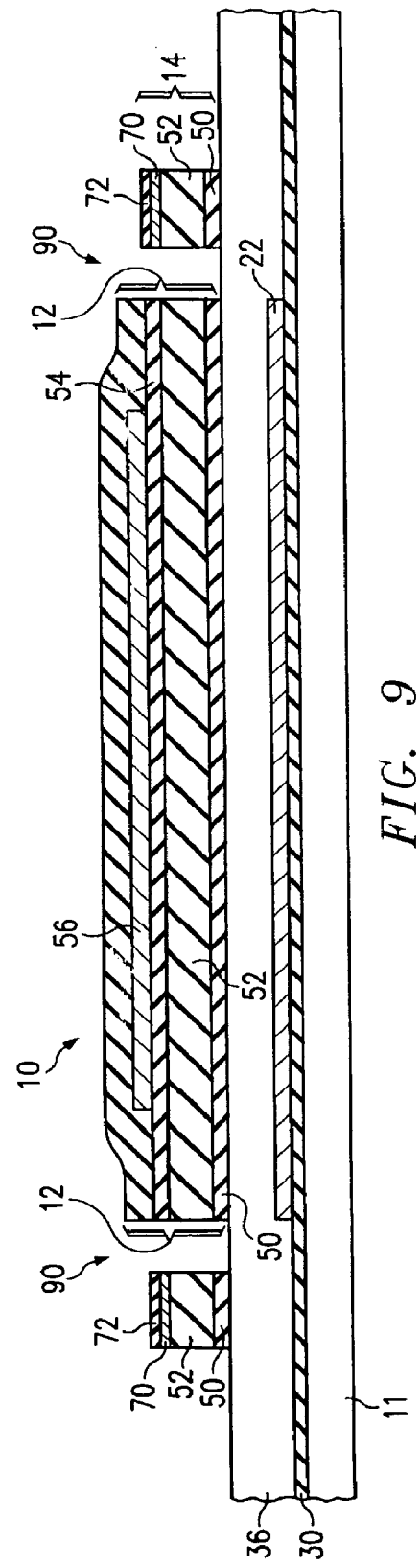
FIG. 9 is a cross-section schematic illustration of the microbolometer of one embodiment disclosed herein prior to removal of a polyimide layer.

Referring to FIG. 9, a cross-section of microbolometer 10 is shown. Thermal isolation leg gaps 90 illustrate that all layers above polyimide layer 36 have been removed in the areas where there is no microbolometer 10 structure.

Figure 10:
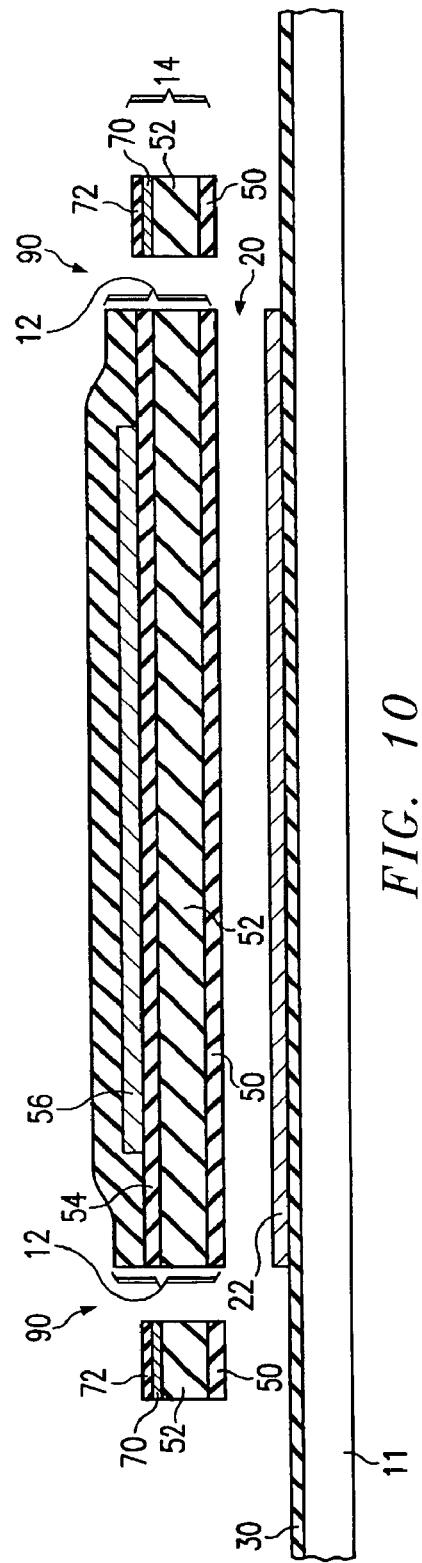
FIG. 10 is a cross-section illustration of the completed microbolometer of one embodiment disclosed herein.

Referring to FIG. 10, polyimide layer 36 may be removed by exposing the structure to an oxygen plasma dry etch. The byproduct of this etching process is carbon dioxide eliminating the need to specially dispose of the byproduct of etching.

Figure 13A:
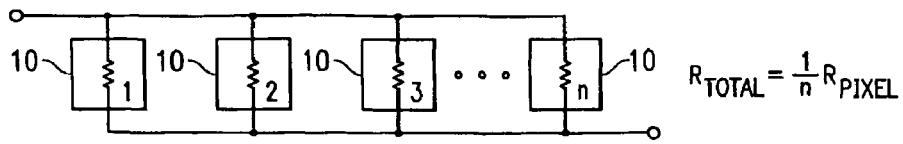
FIG. 13A is an illustration of a configuration of microbolometers in accordance with one embodiment disclosed herein wherein non-imaging pixels are connected electrically in parallel.
Figure 14A:
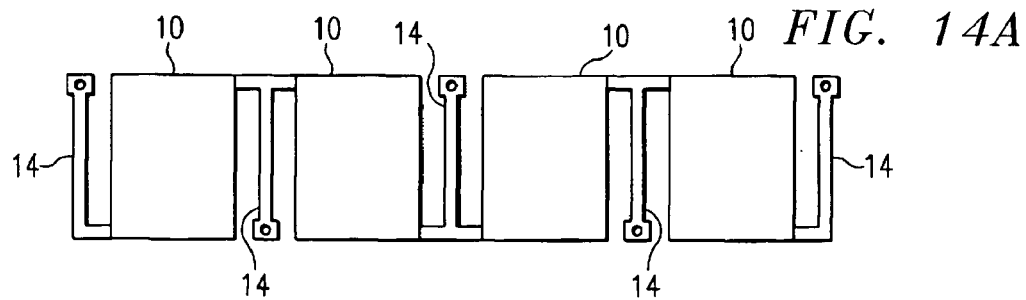
FIG. 14A is a schematic illustration of a linear non-imaging pixel array with shared thermal isolation legs for adjacent microbolometers of one embodiment disclosed herein.

Referring to FIG. 13A and FIG. 14A several microbolometers 10 may be formed in one embodiment on a substrate in an electrically parallel microbolometer array structure to produce a large non-imaging microbolometer with less inherent noise, as the noise figure is reduced by the square root of the number of pixels electrically in parallel. As illustrated in FIG. 14A, the parallel thermal isolation legs of the microbolometer array structure may be shared between two adjacent microbolometers. The sharing of thermal isolation legs results in more thermal isolation and, thus, less thermal coupling to the substrate. This results in a more sensitive bolometer. The parallel microbolometer array structure may be formed without adjacent microbolometers sharing thermal isolation legs. The result is less thermal isolation and, thus, a higher operating frequency as compared to microbolometer array structures with shared thermal isolation legs. The corners of adjacent microbolometers 10 in large non-imaging microbolometer arrays are at an equipotential and may be connected together to form a more rigid microbolometer array structure. A more rigid microbolometer array structure results in a microbolometer array more tolerant to stress.

Figure 13B:
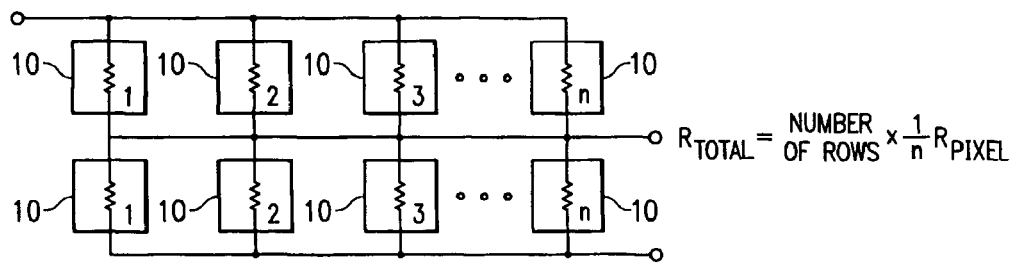
FIG. 13B illustrates an array of microbolometers in accordance with one embodiment disclosed herein wherein non-imaging pixels are connected in an electrically series-parallel circuit.

Referring to FIG. 13A the electrically parallel array embodiment provides a technical advantage for parallel groups of long narrow detector lines, such as for a spectrometer. The electrically series-parallel configuration of FIG. 13B is useful and provides technical advantages for large rectangular arrays of detector elements functioning as a single detector.

Several microbolometers 10 may be formed and placed in a single vacuum package to form a pixel array structure for thermal imaging. In this embodiment, the microbolometers 10 are discrete devices detecting thermal energy in a specific portion of a target (scene) area. For example, microbolometers 10 may be formed on a device wafer and then sealingly assembled with a lid wafer that is at least partially transmissive of infrared radiation (i.e., having at least some infrared radiation transmission characteristics) in the presence of a vacuum to sealingly contain a vacuum therebetween, although non-vacuum packaged device wafer/lid wafer package combinations are also possible.

In a thermal imaging array embodiment, select microbolometers within the microbolometer array structure may have an infrared shield deposited on the upper surface of the microbolometer and/or the thermal shunt 18 may be extended to the detector membrane 12 to provide reference detector elements that are non-responsive to incident radiation. These infrared shield depositions provide an ambient temperature reference resistance for comparison with the resistance of the detector pixel. These reference pixels are thermally isolated from the substrate and therefore respond to the joule heating by bias current as do the detector pixels.

Figure 11:
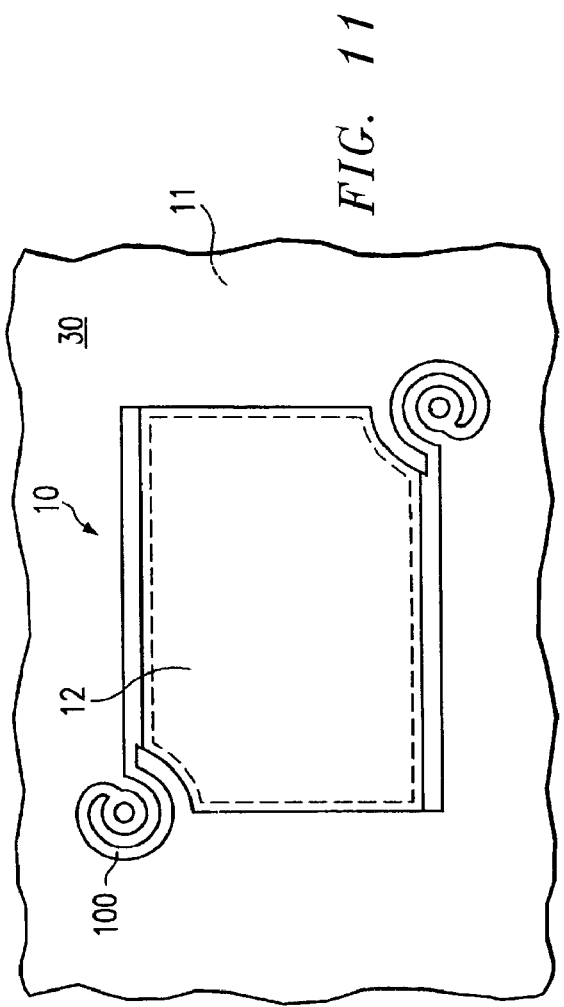
FIG. 11 is an illustration of a microbolometer with spiral legs.
Figure 14B:
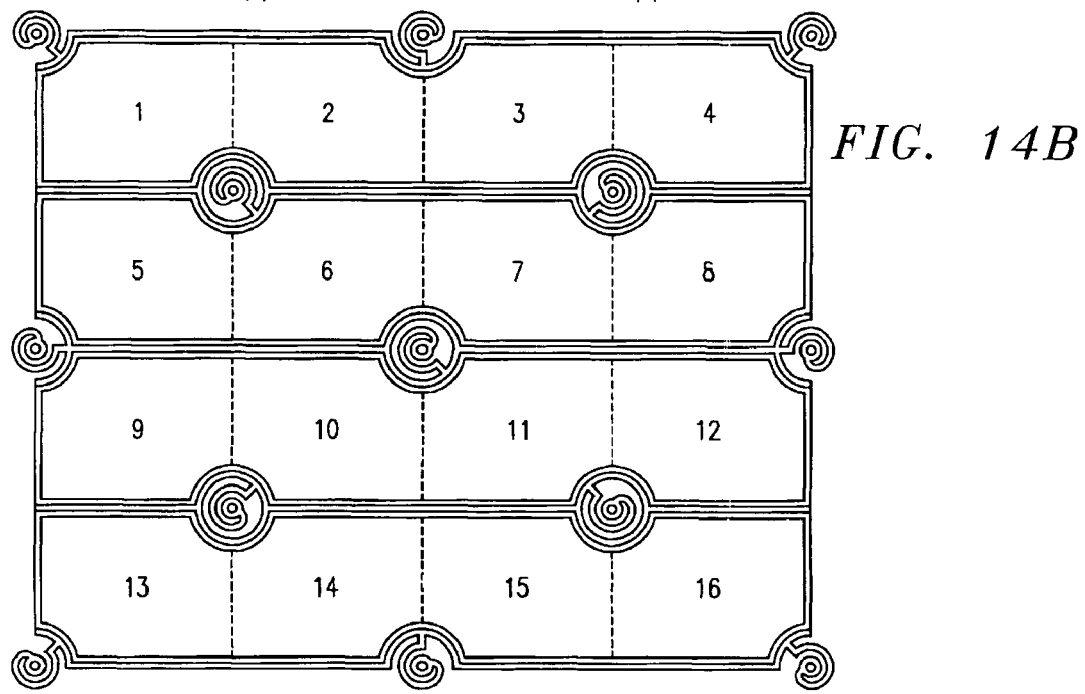

Referring to FIG. 11, an alternate embodiment of microbolometer 10 is illustrated and includes spiral legs 100. Spiral legs 100 are equivalent to thermal isolation legs 14 as previously described. The spiral leg pixel configuration has utility both in imaging arrays and non-imaging arrays. It may be a desirable configuration for non-imaging arrays because the spiral leg configuration provides a higher fill factor and provides a more stressed-tolerant microbolometer. In the spiral leg configuration the detector membrane may be essentially a continuous sheet with openings for the spiral legs with the membrane in contact to the substrate as illustrated in FIG. 14B. The electrode 70 (see FIG. 10) may have a thickness equal to the absorber 56 and therefore also contributes to the absorption IR energy. As shown in FIG. 14B there is an array of 16 spiral leg pixels connected electrically in parallel. The spiral legs and pixels of FIG. 14B are as described previously with reference to FIG. 11.

Figure 13C:
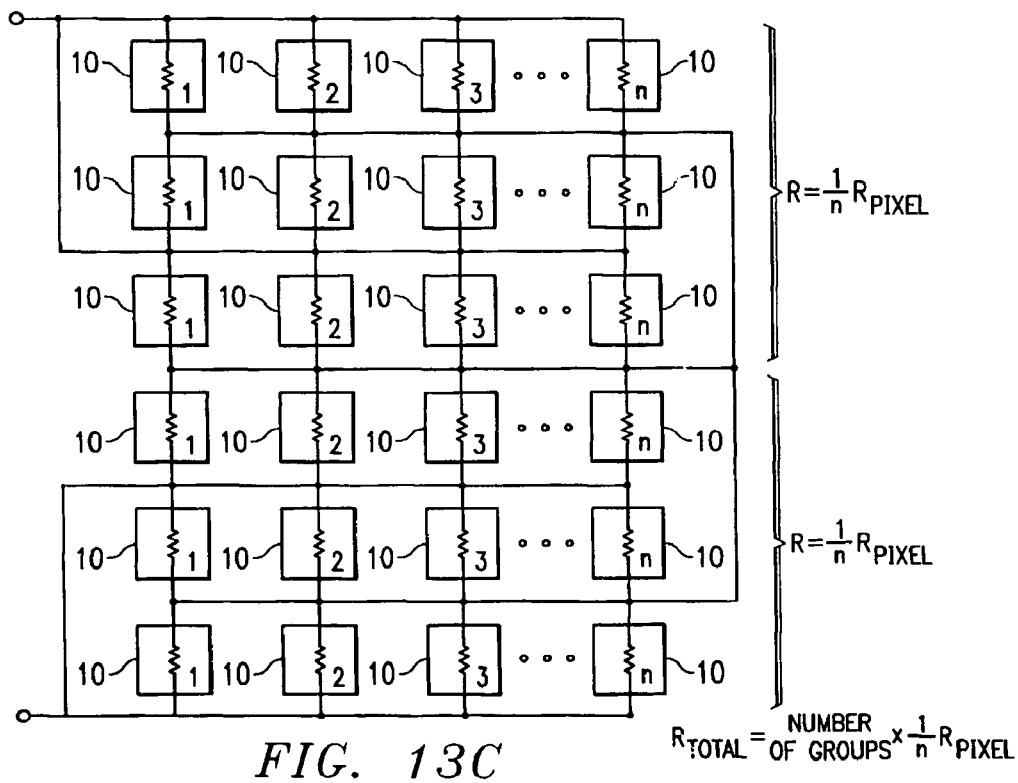
FIG. 13C schematically illustrates an electrical series-parallel configuration of non-imaging pixels for a large array.

A spiral leg array such as illustrated in FIG. 14B may be configured in an electrically parallel connection as shown in FIG. 13A or in a series-parallel connection as illustrated in FIGS. 13B and 13C. The spiral leg design may also have an IR shield deposition on the upper surface to form reference pixels as previously described. Further, the spiral leg configuration may have metal deposition as a thermal shunt on the spiral leg as previously described for the thermal isolation leg 14. For an imaging array configuration the spiral leg design may be employed to provide a larger detector for a given surface area (higher fill factor) on a substrate and to provide a more stress-tolerant microbolometer. Spiral legs 100 may be formed using the same process as thermal isolation legs 14 as earlier described.

Figure 15:
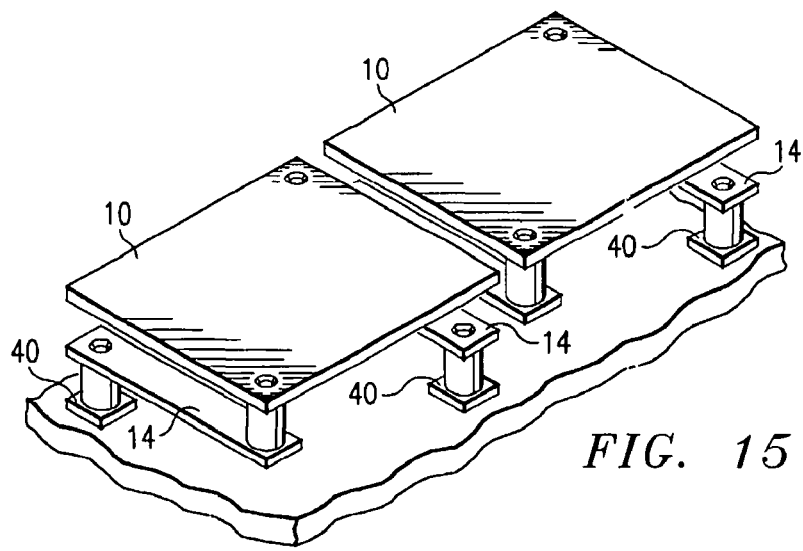
FIG. 15 illustrates another embodiment of a microbolometer formed in accordance with one embodiment disclosed herein for maximizing the fill factor and minimizing space between adjacent microbolometers.

FIG. 15 illustrates an exemplary embodiment having thermal isolation legs 14 formed between the substrate 11 (not shown in FIG. 15) and a bolometer 10. This provides the technical advantage of a maximized fill factor since a relatively small absorbing surface area is sacrificed for supporting legs and spaced between adjacent pixels. In the embodiment of FIG. 15 the thermal isolation leg 14 (only one shown) is spaced below the bolometer 10 with the connection pads 40 on the surface of the supporting substrate as illustrated in FIGS. 1 and 2.

Figure 12:
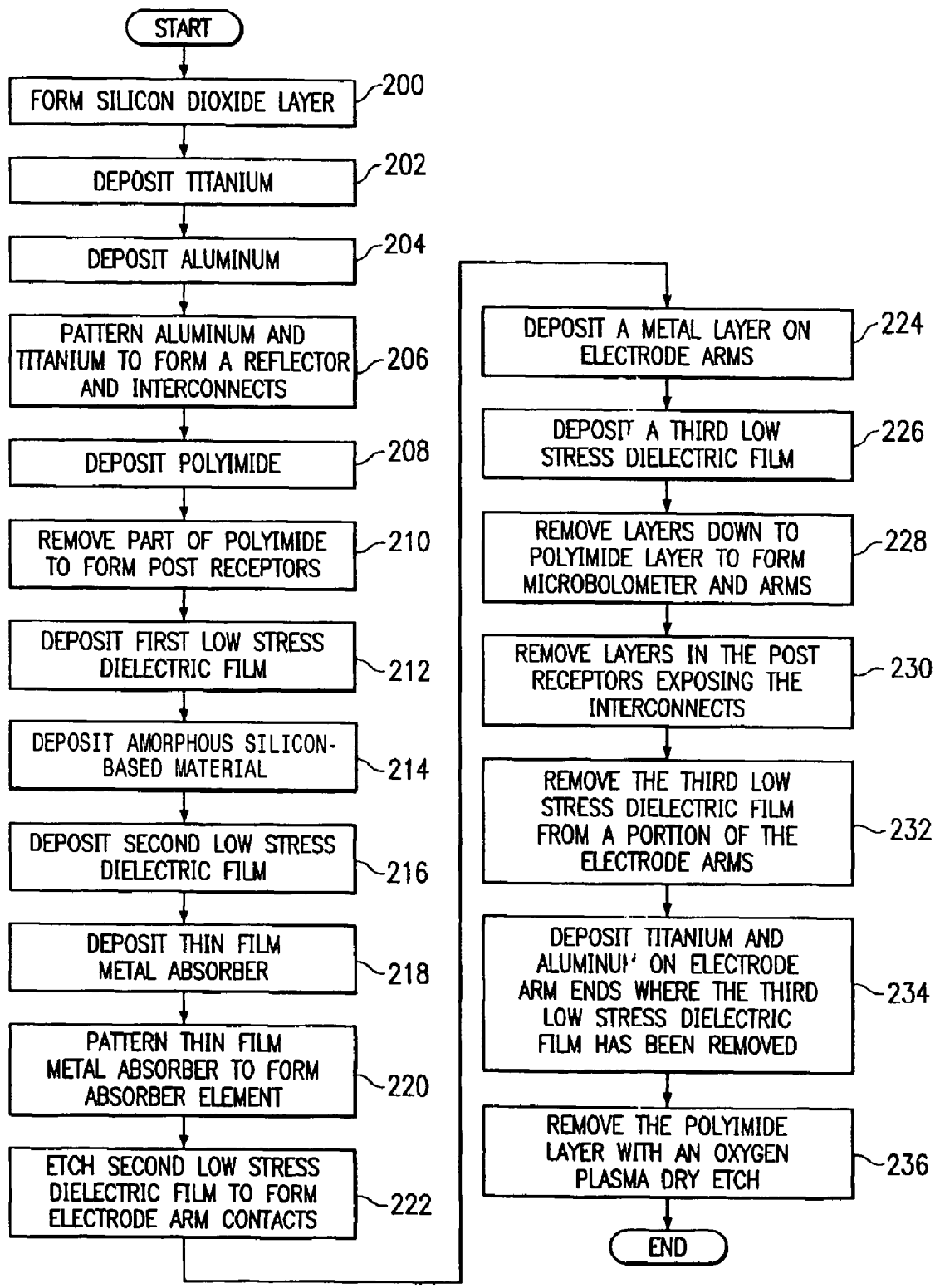
FIG. 12 is a flow diagram illustrating the formation of the microbolometer of one embodiment disclosed herein.

Referring now to FIG. 12, a flow diagram summarizing the formation of microbolometer 10 according to one exemplary embodiment. The method begins at step 200 where silicon dioxide layer 30 is formed on substrate 11. The method proceeds to step 202 where titanium layer 32 is deposited on silicon dioxide layer 30. The method proceeds to step 204 where aluminum layer 34 is deposited on titanium layer 32. The method proceeds to step 206 where titanium layer 32 and aluminum layer 34 are patterned using a photoresist and etch process to form connection pads 40 and reflector 20.

The method proceeds to step 208 where polyimide layer 36 is deposited over the entire structure to a depth on the order of one-quarter wave length of the infrared radiation to be detected. The method proceeds to step 210 where post receptors 38 are formed by removing a portion of polyimide layer 36 thereby exposing connection pads 40. The method proceeds to step 212 where the first low stress dielectric film 50 is formed on the surface of the existing structure. The method proceeds to step 214 where amorphous silicon-based material detector element layer 52 is formed on first low stress dielectric film 50. As described elsewhere herein, amorphous silicon-based material of detector element layer 52 may be an undoped or doped (p-type or n-type) hydrogenated amorphous silicon (a-Si:H), hydrogenated fluorinated amorphous silicon (a-Si:H:F), amorphous silicon germanium (a-Si$_{1-x}$Ge$_x$), hydrogenated amorphous silicon germanium (a-Si$_{1-x}$Ge$_x$:H), or hydrogenated fluorinated amorphous silicon germanium (a-Si$_{1-x}$Ge$_x$:H:F). An amorphous silicon-based material film may be grown in step 214, for example, by chemical vapor deposition (CVD), such as plasma enhanced chemical vapor deposition (PECVD), using silane and optionally one or more other precursors.

The method proceeds to step 216 where second low stress dielectric film 54 is deposited on detector element layer 52. The method proceeds to step 218 where a thin metal absorber film 56 is deposited on second low stress dielectric film 54. The method proceeds to step 220 where thin metal absorber film 56 is patterned leaving absorber 56.

The method proceeds to step 222 where second low stress dielectric film 54 is patterned with openings etched to expose portions of the outer surface of detector element layer 52 to define thermal isolation leg channels 60. The method proceeds to step 224 where thin electrode metal layer 70 is deposited in thermal isolation leg channels 60.

The method proceeds to step 226 where a third low stress dielectric film 72 is deposited on the surface of the structure. The method proceeds to step 228 where a photoresist and etch technique is used to pattern the structure to form microbolometer 10 by removing previously deposited layers down to polyimide layer 36. The method proceeds to step 230 where post receptors 38 are formed by removing previously deposited layers thereby exposing connection pads 40.

The method proceeds to step 232 where third low stress dielectric film 72 is removed from thermal isolation legs 14 in the area to receive post 80 and thermal shunt 18. The method proceeds to step 234 where titanium layer 82 and aluminum layer 84 are formed and patterned leaving thin titanium layer 82 and aluminum layer 84 in post receptor 38 and on electrode terminal end 15. The method proceeds to step 236 where polyimide layer 36 is removed by exposing the structure to an oxygen plasma dry etch. At the conclusion of step 236, microbolometer 10 is complete and suspended above reflector 22 by thermal isolation legs 14 and posts 16.

It will be understood that the methodology of FIG. 12 is exemplary only, and that other steps, combinations of steps, and/or sequence of steps are possible that are suitable for forming a microbolometer having a desired configuration and amorphous silicon-based material construction are possible. Furthermore, the various structures depicted and described herein in relation to FIGS. 1-11 and 13-15 are exemplary. In this regard, the disclosed amorphous silicon-based materials may be employed to form microbolometer membrane structures for microbolometer infrared detector elements having any other configuration suitable for detection of infrared radiation.

Figure 16:
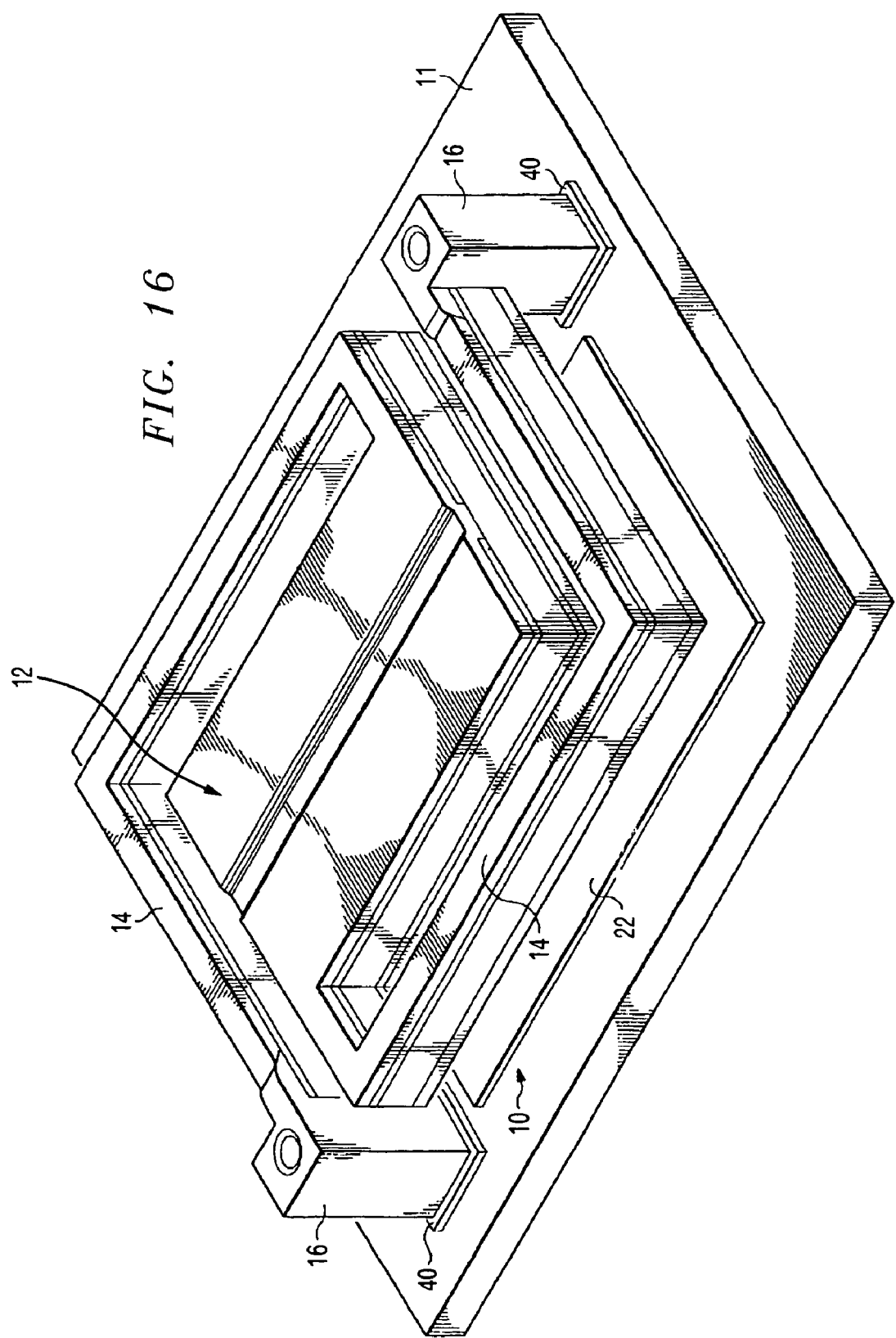
FIG. 16 is a perspective of a microbolometer infrared detector element formed on a substrate in accordance with one embodiment disclosed herein.
Figure 17:
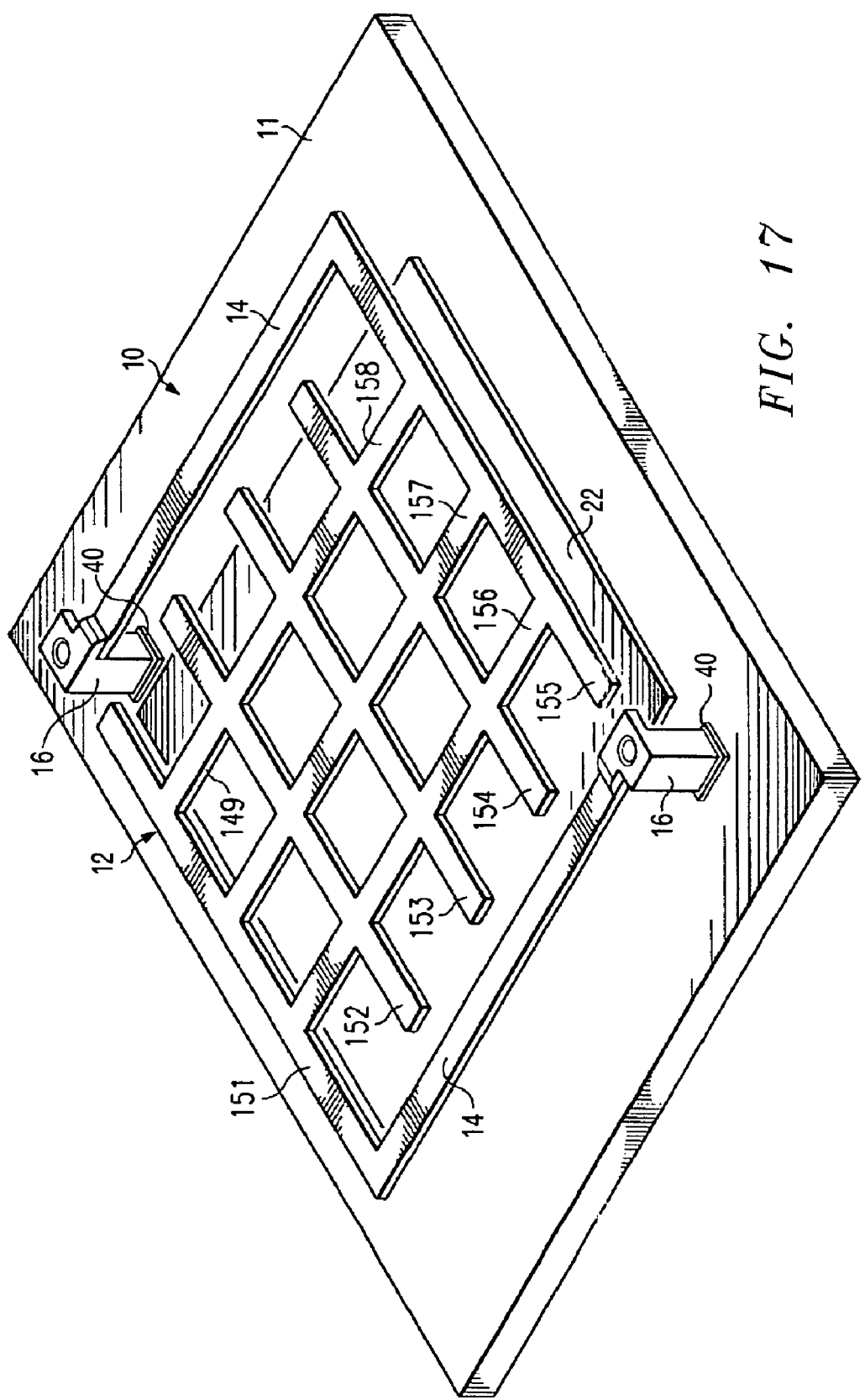
FIG. 17 is a perspective of a microbolometer infrared detector element formed on a substrate in accordance with one embodiment disclosed herein.

The disclosed amorphous silicon-based materials may be employed, for example, with microbolometer infrared detector structures and methods for forming the same that are illustrated in described in U.S. Pat. No. 6,777,681 and U.S. Pat. No. 6,690,014, each of which is incorporated herein by reference. In this regard the disclosed amorphous silicon-based materials may be employed in the place of amorphous silicon layers of microbolometer infrared detector structures described in these references. For example, FIGS. 16 and 17 herein illustrate alternative exemplary embodiments of microbolometer infrared detector elements 10 having membranes 12 that may include the disclosed amorphous silicon-based materials. Such microbolometer detector element configurations are described in further detail in U.S. Pat. No. 6,777,681. In particular, FIG. 17 illustrates a microbolometer infrared detector element 10 having diffractive resonance cavity structure in which membrane 12 has 16 openings 149 provided through it, in a cross-grating pattern which forms a four-by-four array (grid) of openings. Due to the presence of the openings, the membrane 12 may be viewed as having five spaced and parallel strips 151-155 that extend in one direction, and three spaced and parallel strips 156-158 that extend from the strip 151 to the strip 155 in a direction perpendicular to the strips 151-155. It will be understood that FIGS. 16 and 17 are exemplary only, and that the disclosed amorphous silicon-based materials may be employed as layers in microbolometer infrared detector structures of other configurations, e.g., employed in the place of conventional amorphous silicon layers in microbolometer infrared detector structures.

Additionally, microbolometer infrared detector elements formed from the disclosed amorphous silicon-based materials may be employed to form focal plane arrays that may be packaged, for example, using vacuum packaging techniques described and illustrated in U.S. Pat. No. 6,586,831, U.S. Pat. No. 6,521,477, U.S. Pat. No. 6,479,320, United States Patent Publication number 2004/0219704, and U.S. patent application Ser. No. 11/141,356, each of which is incorporated herein by reference.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed structures, systems and methods may be utilized in various combinations and/or independently. Thus the invention is not limited to only those combinations shown herein, but rather may include other combinations.

What is claimed is:

1. An infrared detector element comprising:
   a substrate; and
   an infrared detector membrane disposed in spaced relationship above said substrate;
   wherein said infrared detector membrane comprises an amorphous silicon-based material, said amorphous silicon-based material comprising at least one of a fluorinated amorphous silicon-based material, an amorphous silicon germanium-based material, an amorphous germanium-based material, a hydrogenated amorphous silicon-based material having a hydrogen content of greater than about 4 atomic percent, or a combination thereof; and
   wherein a material structure of said amorphous silicon-based material comprises microcrystallites.

2. The infrared detector element of claim 1, wherein said amorphous silicon-based material comprises at least one of fluorinated amorphous silicon, hydrogenated fluorinated amorphous silicon, amorphous silicon germanium, hydrogenated amorphous silicon germanium, fluorinated amorphous silicon germanium, hydrogenated fluorinated amorphous silicon germanium, hydrogenated amorphous silicon-based material having a hydrogen content of greater than about 4 atomic percent, or a combination thereof.

3. The infrared detector element of claim 1, wherein said amorphous silicon-based material comprises at least one of a fluorinated amorphous silicon-based material, an amorphous silicon germanium-based material, or a combination thereof.

4. The infrared detector element of claim 3, wherein said amorphous silicon-based material comprises at least one of fluorinated amorphous silicon, hydrogenated fluorinated amorphous silicon, amorphous silicon germanium, hydrogenated amorphous silicon germanium, fluorinated amorphous silicon germanium, hydrogenated fluorinated amorphous silicon germanium, or a combination thereof.

5. The infrared detector element of claim 1, wherein said amorphous silicon-based material comprises fluorinated amorphous silicon-based material.

6. The infrared detector element of claim 1, wherein said amorphous silicon-based material comprises amorphous silicon germanium-based material.

7. The infrared detector element of claim 1, wherein said amorphous silicon-based material comprises a fluorinated amorphous silicon-based material doped with a p-type dopant, said p-doped fluorinated amorphous silicon-based material comprising at least one of p-doped fluorinated amorphous silicon, p-doped hydrogenated fluorinated amorphous silicon, p-doped fluorinated amorphous silicon germanium, p-doped hydrogenated fluorinated amorphous silicon germanium, or a combination thereof; and wherein said p-type dopant comprises boron.

8. The infrared detector element of claim 1, wherein an amount of said microcrystallites in said material structure of said amorphous silicon-based material is less than or equal to about 10% by volume of the amorphous silicon-based material, said microcrystallines being from about 1 nanometers to about 10 nanometers in size.

9. The infrared detector element of claim 1, wherein said amorphous silicon-based material comprises a hydrogenated amorphous silicon-based material having a hydrogen content of greater than about 4 atomic percent.

10. The infrared detector element of claim 1, wherein said substrate comprises read out integrated circuitry (ROIC); and wherein said infrared detector membrane is suspended in spaced relationship above said substrate and electrically coupled to said ROIC by two thermal isolation legs.

11. The infrared detector element of claim 1, further comprising an anti-reflective structure disposed between said substrate and said infrared detector membrane.

12. The infrared detector element of claim 11, wherein said anti-reflective structure comprises a reflector; and wherein said infrared detector membrane is disposed above said reflector at a height of one-quarter wavelength of the infrared radiation to be detected.

13. The infrared detector element of claim 1, wherein said infrared detector membrane has at least one opening defined therein.

14. The infrared detector element of claim 13, wherein said at least one opening comprises a plurality of openings configured as a grid of openings defined in said infrared detector membrane; and wherein said infrared detector element comprises a diffractive resonant cavity (DRC) microbolometer structure and further comprises a reflector disposed between said substrate and said infrared detector membrane and having an upper surface configured to reflect infrared radiation.

15. A focal plane array, comprising a plurality of infrared detector elements of claim 1.

16. A focal plane array assembly, comprising:
a substrate; and
a plurality of infrared detector elements, each of said plurality of infrared detector elements comprising an infrared detector membrane disposed in spaced relationship above said substrate, and read out integrated circuitry (ROIC) electrically coupled to said infrared detector membrane;
wherein said infrared detector membrane of each of said plurality of infrared detector elements comprises an amorphous silicon-based material, said amorphous silicon-based material comprising at least one of a fluorinated amorphous silicon-based material, an amorphous silicon germanium-based material, an amorphous germanium-based material, a hydrogenated amorphous silicon-based material having a hydrogen content of greater than about 4 atomic percent, or a combination thereof; and
wherein a material structure of said amorphous silicon-based material comprises microcrystallites.

17. The focal plane array assembly of claim 16, wherein said amorphous silicon-based material of each of said plurality of infrared detector elements comprises at least one of fluorinated amorphous silicon, hydrogenated fluorinated amorphous silicon, amorphous silicon germanium, hydrogenated amorphous silicon germanium, fluorinated amorphous silicon germanium, hydrogenated fluorinated amorphous silicon germanium, hydrogenated amorphous silicon-based material having a hydrogen content of greater than about 4 atomic percent, or a combination thereof.

18. The focal plane array assembly of claim 16, wherein said amorphous silicon-based material of each of said plurality of infrared detector elements comprises at least one of a fluorinated amorphous silicon-based material, an amorphous silicon germanium-based material, or a combination thereof.

19. The focal plane array assembly of claim 18, wherein said amorphous silicon-based material of each of said plurality of infrared detector elements comprises at least one of fluorinated amorphous silicon, hydrogenated fluorinated amorphous silicon, amorphous silicon germanium, hydrogenated amorphous silicon germanium, fluorinated amorphous silicon germanium, hydrogenated fluorinated amorphous silicon germanium, or a combination thereof.

20. The focal plane array assembly of claim 16, wherein said amorphous silicon-based material of each of said plurality of infrared detector elements comprises fluorinated amorphous silicon-based material.

21. The focal plane array assembly of claim 16, wherein said amorphous silicon-based material of each of said plurality of infrared detector elements comprises amorphous silicon germanium-based material.

22. The focal plane array assembly of claim 16, wherein said amorphous silicon-based material of each of said plurality of infrared detector elements comprises a fluorinated amorphous silicon-based material doped with a p-type dopant, said p-doped fluorinated amorphous silicon-based material comprising at least one of p-doped fluorinated amorphous silicon, p-doped hydrogenated fluorinated amorphous silicon, p-doped fluorinated amorphous silicon germanium, p-doped hydrogenated fluorinated amorphous silicon germanium, or a combination thereof; and wherein said p-type dopant comprises boron.

23. The focal plane array assembly of claim 16, wherein an amount of said microcrystallites in said material structure of said amorphous silicon-based material is less than or equal to about 10% by volume of the amorphous silicon-based material, said microcrystallines being from about 1 nanometers to about 10 nanometers in size.

24. The focal plane array assembly of claim 16, wherein said amorphous silicon-based material of each of said plurality of infrared detector elements comprises a hydrogenated amorphous silicon-based material having a hydrogen content of greater than about 4 atomic percent.

25. The focal plane array assembly of claim 24, wherein said hydrogenated amorphous silicon-based material of each of said plurality of infrared detector elements comprises at least one of hydrogenated amorphous silicon, hydrogenated fluorinated amorphous silicon, hydrogenated amorphous silicon germanium, hydrogenated fluorinated amorphous silicon germanium, or a combination thereof.

26. A wafer-level packaged focal plane array assembly, comprising:
a device wafer, said device wafer comprising said focal plane array assembly of claim 16; and
a lid wafer, said lid wafer being at least partially transmissive of infrared radiation and being assembled to said device wafer such that said lid wafer allows infrared radiation to reach said focal plane array assembly through said lid wafer.

27. The wafer-level packaged focal plane array assembly of claim 26, wherein said lid wafer is sealingly assembled to said device wafer and contains a vacuum therebetween to form a wafer-level packaged focal plane array assembly.

28. A method for making an infrared detector element comprising:
providing a substrate; and
forming an infrared detector membrane in spaced relationship above a surface of said substrate;
wherein said infrared detector membrane comprises an amorphous silicon-based material, said amorphous silicon-based material comprising at least one of a fluorinated amorphous silicon-based material, an amorphous silicon germanium-based material, an amorphous germanium-based material, a hydrogenated amorphous silicon-based material having a hydrogen content of greater than about 4 atomic percent, or a combination thereof;

wherein said method comprises forming said amorphous silicon-based material from at least one silicon source that is diluted with hydrogen gas; and wherein a material structure of said amorphous silicon-based material comprises microcrystallites.

29. The method of claim 28, wherein said amorphous silicon-based material comprises at least one of fluorinated amorphous silicon, hydrogenated fluorinated amorphous silicon, amorphous silicon germanium, hydrogenated amorphous silicon germanium, fluorinated amorphous silicon germanium, hydrogenated fluorinated amorphous silicon germanium, hydrogenated amorphous silicon-based material having a hydrogen content of greater than about 4 atomic percent, or a combination thereof.

30. The method of claim 28, wherein said amorphous silicon-based material comprises at least one of a fluorinated amorphous silicon-based material, an amorphous silicon germanium-based material, or a combination thereof.

31. The method of claim 28, wherein said amorphous silicon-based material comprises at least one of fluorinated amorphous silicon, hydrogenated fluorinated amorphous silicon, amorphous silicon germanium, hydrogenated amorphous silicon germanium, fluorinated amorphous silicon germanium, hydrogenated fluorinated amorphous silicon germanium, or a combination thereof.

32. The method of claim 28, wherein said amorphous silicon-based material comprises fluorinated amorphous silicon-based material.

33. The method of claim 28, wherein said amorphous silicon-based material comprises amorphous silicon germanium-based material.

34. The method of claim 28, further comprising doping said amorphous silicon-based material by forming said amorphous silicon-based material with precursors that comprise boron trifluoride ($BF_3$).

35. The method of claim 28, further comprising forming said amorphous silicon-based material such that an amount of said microcrystallites in said material structure of said amorphous silicon-based material is less than or equal to about 10% by volume of the amorphous silicon-based material, said microcrystallites being from about 1 nanometers to about 10 nanometers in size.

36. The method of claim 28, wherein said amorphous silicon-based material comprises at least one of hydrogenated amorphous silicon, hydrogenated fluorinated amorphous silicon, hydrogenated amorphous silicon germanium, hydrogenated fluorinated amorphous silicon germanium, or a combination thereof.

37. The method of claim 28, further comprising:
forming read out integrated circuitry (ROIC) within said substrate;
forming two thermal isolation legs between said substrate and said infrared detector membrane to suspend said infrared detector membrane in spaced relationship above said substrate; and
electrically coupling said infrared detector membrane to said ROIC.

38. The method of claim 28, further comprising forming an anti-reflective structure between said substrate and said infrared detector membrane.

39. The method of claim 38, wherein said anti-reflective structure comprises a reflector; and wherein said method further comprises forming said infrared detector membrane in spaced relationship above said reflector at a height of one-quarter wavelength of the infrared radiation to be detected.

40. The method of claim 28, further comprising forming at least one opening within said infrared detector membrane.

41. The method of claim 40, further comprising:
forming a plurality of openings configured as a grid of openings in said infrared detector membrane; and
forming a reflector between said substrate and said infrared detector membrane, said reflector having an upper surface configured to reflect infrared radiation.

42. A method of forming a focal plane array, comprising forming a plurality of infrared detector elements of claim 28.

43. A method of making a focal plane array assembly, comprising:
providing a substrate; and
forming a plurality of infrared detector elements, each of said plurality of infrared detector elements comprising an infrared detector membrane disposed in spaced relationship above said substrate, and read out integrated circuitry (ROIC) electrically coupled to said infrared detector membrane;
wherein said infrared detector membrane comprises an amorphous silicon-based material, said amorphous silicon-based material comprising at least one of a fluorinated amorphous silicon-based material, an amorphous silicon germanium-based material, an amorphous germanium-based material, a hydrogenated amorphous silicon-based material having a hydrogen content of greater than about 4 atomic percent, or a combination thereof;
wherein said method comprises forming said amorphous silicon-based material from at least one silicon source that is diluted with hydrogen gas; and
wherein a material structure of said amorphous silicon-based material comprises microcrystallites.

44. The method of claim 43, wherein said amorphous silicon-based material comprises at least one of fluorinated amorphous silicon, hydrogenated fluorinated amorphous silicon, amorphous silicon germanium, hydrogenated amorphous silicon germanium, fluorinated amorphous silicon germanium, hydrogenated fluorinated amorphous silicon germanium, hydrogenated amorphous silicon-based material having a hydrogen content of greater than about 4 atomic percent, or a combination thereof.

45. The method of claim 43, wherein said amorphous silicon-based material comprises at least one of a fluorinated amorphous silicon-based material, an amorphous silicon germanium-based material, or a combination thereof.

46. The method of claim 45, wherein said amorphous silicon-based material of each of said plurality of infrared detector elements comprises at least one of fluorinated amorphous silicon, hydrogenated fluorinated amorphous silicon, amorphous silicon germanium, hydrogenated amorphous silicon germanium, fluorinated amorphous silicon germanium, hydrogenated fluorinated amorphous silicon germanium, or a combination thereof.

47. The method of claim 43, wherein said amorphous silicon-based material of each of said plurality of infrared detector elements comprises fluorinated amorphous silicon-based material.

48. The method of claim 43, wherein said amorphous silicon-based material of each of said plurality of infrared detector elements comprises amorphous silicon germanium-based material.

49. The method of claim 43, further comprising doping said amorphous silicon-based material by forming said amorphous silicon-based material with precursors that comprise boron trifluoride ($BF_3$).

50. The method of claim 43, further comprising forming said amorphous silicon-based material such that an amount of said microcrystallites in said material structure of said amorphous silicon-based material is less than or equal to about 10% by volume of the amorphous silicon-based material, said microcrystallites being from about 1 nanometers to about 10 nanometers in size.

51. The method of claim 43, wherein said amorphous silicon-based material of each of said plurality of infrared detector elements comprises at least one of hydrogenated amorphous silicon, hydrogenated fluorinated amorphous silicon, hydrogenated amorphous silicon germanium, hydrogenated fluorinated amorphous silicon germanium, or a combination thereof.

52. A method of making a wafer-level packaged focal plane array assembly, comprising:
    providing a device wafer, said device wafer comprising said focal plane array assembly of claim 43;
    providing a lid wafer, said lid wafer being at least partially transmissive of infrared radiation; and
    assembling said lid wafer to said device wafer to form said wafer-level packaged focal plane array assembly, and such that said lid wafer allows infrared radiation to reach said focal plane array assembly through said lid wafer.

53. The method of claim 52, further comprising assembling and sealing said lid wafer to said device wafer in the presence of a vacuum such that a vacuum is sealingly contained between said lid wafer and said device wafer to form a wafer-level vacuum packaged focal plane array assembly.

54. A method for making an infrared detector element comprising:
    providing a substrate;
    forming an infrared detector membrane in spaced relationship above a surface of said substrate, said infrared detector membrane comprising amorphous silicon-based material;
    forming said amorphous silicon-based material from precursors comprising at least one source of silicon and boron trifluoride ($BF_3$);
    wherein said method comprises forming said amorphous silicon-based material from at least one silicon source that is diluted with hydrogen gas; and
    wherein a material structure of said amorphous silicon-based material comprises microcrystallites.

55. A method of forming a focal plane array, comprising forming a plurality of infrared detector elements of claim 54.

* * * * *